(12) United States Patent
Pryor

(10) Patent No.: US 7,933,431 B2
(45) Date of Patent: Apr. 26, 2011

(54) CAMERA BASED SENSING IN HANDHELD, MOBILE, GAMING, OR OTHER DEVICES

(76) Inventor: Timothy R. Pryor, Tecumseh (CA)

( * ) Notice: Subject to any disclaimer, the term of this patent is extended or adjusted under 35 U.S.C. 154(b) by 0 days.

(21) Appl. No.: 12/834,281

(22) Filed: Jul. 12, 2010

(65) Prior Publication Data

US 2010/0277412 A1 Nov. 4, 2010

Related U.S. Application Data

(63) Continuation of application No. 11/980,710, filed on Oct. 31, 2007, now Pat. No. 7,756,297, which is a continuation of application No. 10/893,534, filed on Jul. 19, 2004, now Pat. No. 7,401,783, which is a continuation of application No. 09/612,225, filed on Jul. 7, 2000, now Pat. No. 6,766,036.

(60) Provisional application No. 60/142,777, filed on Jul. 8, 1999.

(51) Int. Cl.
*G06K 9/00* (2006.01)

(52) U.S. Cl. ............... 382/103; 382/104; 348/207.1
(58) Field of Classification Search ............ 382/103, 382/104; 348/207.1
See application file for complete search history.

(56) References Cited

U.S. PATENT DOCUMENTS

| | | | | |
|---|---|---|---|---|
| 5,878,174 | A * | 3/1999 | Stewart et al. | 382/293 |
| 6,342,917 | B1 * | 1/2002 | Amenta | 348/207.1 |
| 6,453,180 | B1 * | 9/2002 | Endoh et al. | 455/567 |
| 6,597,817 | B1 * | 7/2003 | Silverbrook | 382/289 |

* cited by examiner

*Primary Examiner* — Tom Y Lu
(74) *Attorney, Agent, or Firm* — Warner Norcross & Judd LLP

(57) ABSTRACT

Method and apparatus are disclosed to enable rapid TV camera and computer based sensing in many practical applications, including, but not limited to, handheld devices, cars, and video games. Several unique forms of social video games are disclosed.

31 Claims, 22 Drawing Sheets

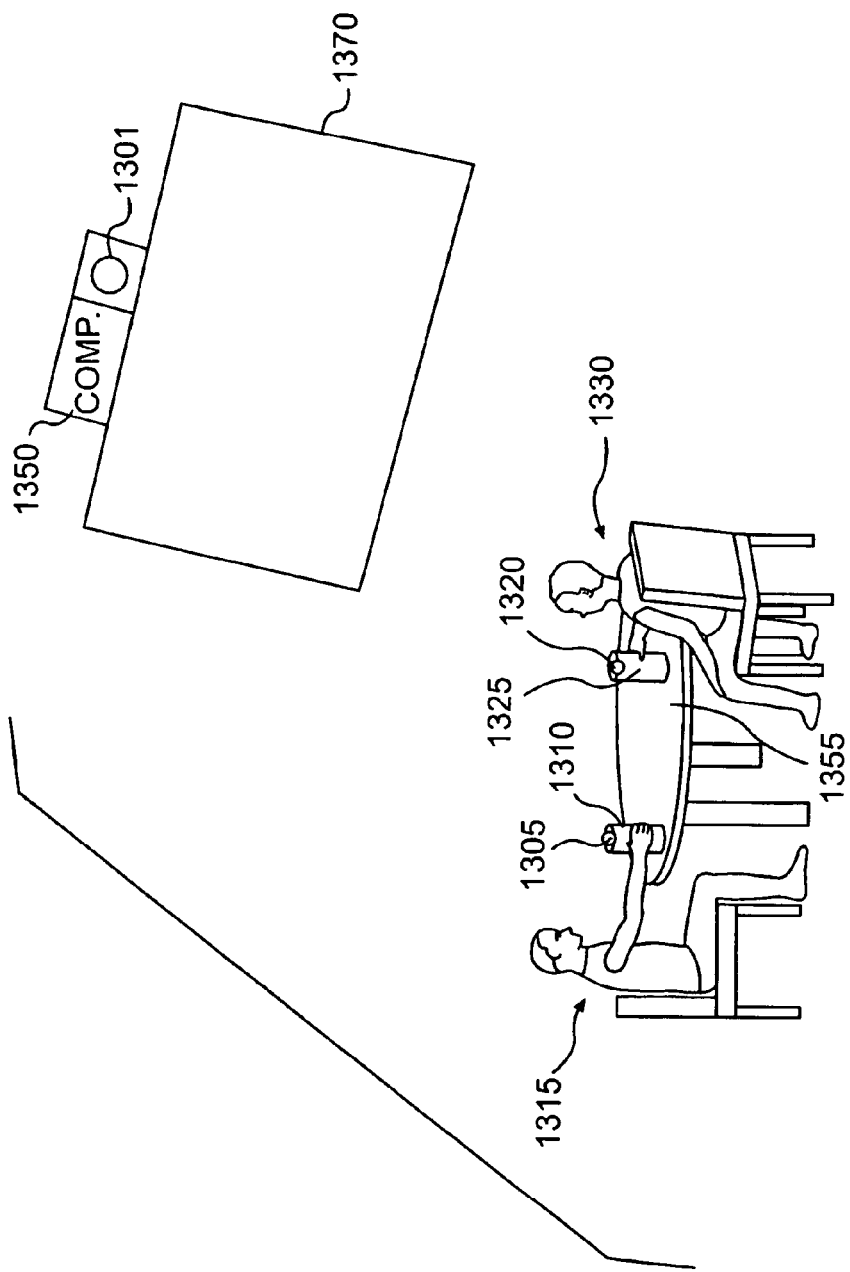

CAMERA BASED SENSING IN HANDHELD, MOBILE, GAMING, OR OTHER DEVICES

CROSS REFERENCE TO RELATED APPLICATIONS

This application is a continuation of application Ser. No. 11/980,710 filed Oct. 31, 2007, now U.S. Pat. No. 7,756,297; which is a continuation of application Ser. No. 10/893,534 filed Jul. 19, 2004, now U.S. Pat. No. 7,401,783; which is a continuation of application Ser. No. 09/612,225 filed Jul. 7, 2000, now U.S. Pat. No. 6,766,036; which claims the benefit of U.S. Provisional Application No. 60/142,777, filed Jul. 8, 1999.

Cross references to related co-pending US applications by the inventor having similar subject matter.
 1. Touch TV and other Man Machine Interfaces: Ser. No. 09/435,854 filed Nov. 8, 1999, now U.S. Pat. No. 7,098,891; which was a continuation of application Ser. No. 07/946,908, now U.S. Pat. No. 5,982,352;
 2. More Useful Man Machine Interfaces and Applications: Ser. No. 09/433,297 filed Nov. 3, 1999, now U.S. Pat. No. 6,750,848;
 3. Useful Man Machine interfaces and applications: Ser. No. 09/138,339, Pub. Appln. 2002-0036617, now abandoned;
 4. Vision Target based assembly: Ser. No. 08/469,907 filed Jun. 6, 1995, now U.S. Pat. No. 6,301,783;
 5. Picture Taking method and apparatus: provisional application 60/133,671, and regular application Ser. No. 09/568,552 filed May 11, 2000, now U.S. Pat. No. 7,015,950;
 6. Methods and Apparatus for Man Machine Interfaces and Related Activity: Provisional Application: provisional application 60/133,673 filed May 11, 1999; and regular application Ser. No. 09/568,554 filed May 11, 2000, now U.S. Pat. No. 6,545,670;
 7. Tactile Touch Screens for Automobile Dashboards, Interiors and Other Applications: provisional application Ser. No. 60/183,807; and regular application Ser. No. 09/789,538, now U.S. Pat. No. 7,084,859; and
 8. Apparel Manufacture and Distance Fashion Shopping in Both Present and Future: provisional application 60/187,397 filed Mar. 7, 2000.

The disclosures of the following U.S. patents and co-pending patent applications by the inventor, or the inventor and his colleagues, are incorporated herein by reference:
 1. "Man machine Interfaces": U.S. application Ser. No. 09/435,854 and U.S. Pat. No. 5,982,352, and U.S. application Ser. No. 08/290,516, filed Aug. 15, 1994, now U.S. Pat. No. 6,008,000, the disclosure of both of which is contained in that of Ser. No. 09/435,854;
 2. "Useful Man Machine Interfaces and Applications": U.S. application Ser. No. 09/138,339, now Pub. Appln. 2002-0036617;
 3. "More Useful Man Machine Interfaces and Applications": U.S. application Ser. No. 09/433,297;
 4. "Methods and Apparatus for Man Machine Interfaces and Related Activity": U.S. Appln. Ser. No. 60/133,673 filed as regular application Ser. No. 09/568,554, now U.S. Pat. No. 6,545,670;
 5. "Tactile Touch Screens for Automobile Dashboards, Interiors and Other Applications": U.S. provisional Appln. Ser. No. 60/183,807, filed Feb. 22, 2000, now filed as reg. application Ser. No. 09/789,538; and
 6. "Apparel Manufacture and Distance Fashion Shopping in Both Present and Future": U.S. Appln. Ser. No. 60/187,397, filed Mar. 7, 2000.

FIELD OF THE INVENTION

The invention relates to simple input devices for computers, particularly, but not necessarily, intended for use with 3-D graphically intensive activities, and operating by optically sensing a human input to a display screen or other object and/or the sensing of human positions or orientations. The invention herein is a continuation in part of several inventions of mine, listed above.

This continuation application seeks to provide further useful embodiments for improving the sensing of objects. Also disclosed are new applications in a variety of fields such as computing, gaming, medicine, and education. Further disclosed are improved systems for display and control purposes.

The invention uses single or multiple TV cameras whose output is analyzed and used as input to a computer, such as a home PC, to typically provide data concerning the location of parts of, or objects held by, a person or persons.

DESCRIPTION OF RELATED ART

The above mentioned co-pending applications incorporated by reference discuss many prior art references in various pertinent fields, which form a background for this invention. Some more specific U.S. Patent references are for example:
 DeMenthon—U.S. Pat. Nos. 5,388,059; 5,297,061; 5,227,985
 Cipolla—U.S. Pat. No. 5,581,276
 Pugh—U.S. Pat. No. 4,631,676
 Pinckney—U.S. Pat. No. 4,219,847

DESCRIPTION OF FIGURES

FIG. 13 illustrates a game embodiment of the invention, such as might be played in a bar.

THE INVENTION EMBODIMENTS

FIG. 1

The invention herein and disclosed in portions of other copending applications noted above, comprehends a combination of one or more TV cameras (or other suitable electro-optical sensors) and a computer to provide various position and orientation related functions of use. It also comprehends the combination of these functions with the basic task of generating, storing and/or transmitting a TV image of the scene acquired—either in two or three dimensions.

Figure 1A:
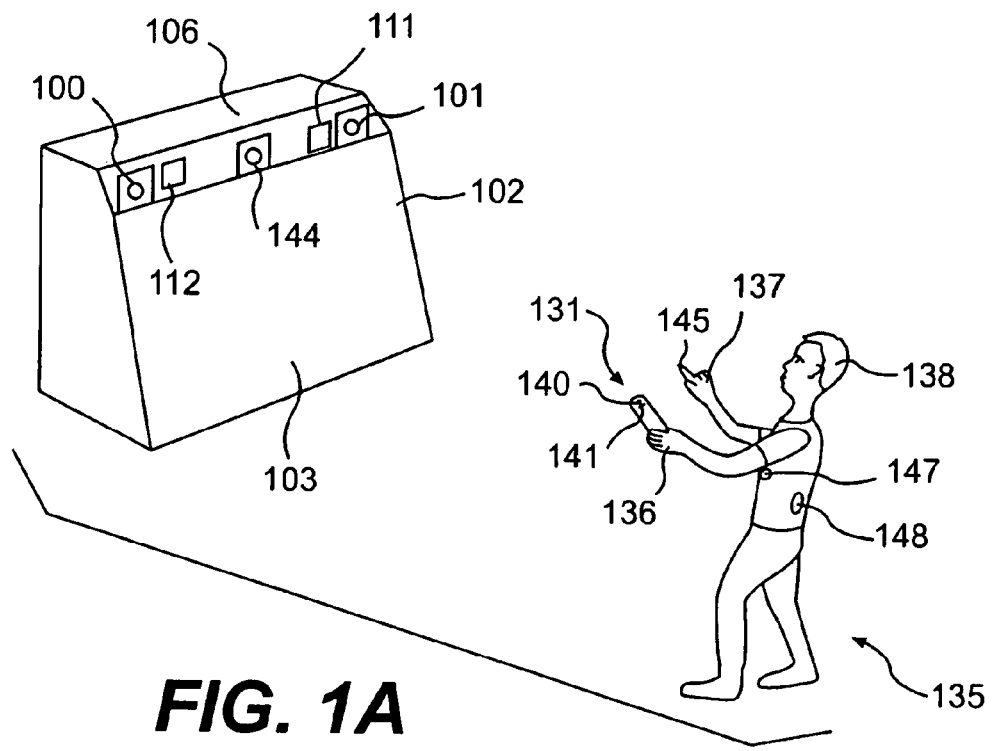
FIG. 1 illustrates a basic computer terminal embodiment of the invention, similar to that disclosed in copending applications.

The embodiment depicted in FIG. 1A illustrates the basic embodiments of many of my co-pending applications above. A stereo pair of cameras 100 and 101 located on each side of the upper surface of monitor 102 (for example a rear projection TV of 60 inch diagonal screen size) with display screen 103 facing the user, are connected to PC computer 106 (integrated in this case into the monitor housing), for example a 400 Mhz Pentium II. For appearances and protection a single extensive cover window may be used to cover both cameras and their associated light sources 110 and 111, typically LEDs.

The LEDs in this application are typically used to illuminate targets associated with any of the fingers, hand, feet and head of the user, or objects such as 131 held by a user, 135 with hands 136 and 137, and head 138. These targets, such as circular target 140 and band target 141 on object 131 are desirably, but not necessarily, retro-reflective, and may be constituted by the object features themselves (e.g., a finger tip, such as 145), or by features provided on clothing worn by the user (e.g., a shirt button 147 or polka dot 148, or by artificial targets other than retroreflectors.

Alternatively, a three camera arrangement can be used, for example using additional camera 144, to provide added sensitivity in certain angular and positional relationships. Still more cameras can be used to further improve matters, as desired. Alternatively, and or in addition, camera 144 can be used for other purposes, such as acquire images of objects such as persons, for transmission, storage or retrieval independent of the cameras used for datum and feature location determination.

Figure 1B:
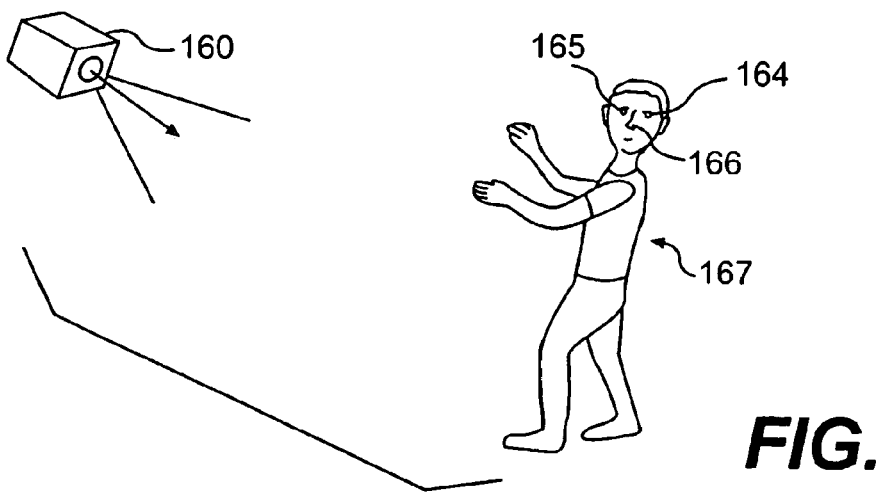

For many applications, a single camera can suffice for measurement purposes as well, such as 160 shown in FIG. 1B for example, used for simple 2 dimensional (2D) measurements in the xy plane perpendicular to the camera axis (z axis), or 3D (xyz, roll pitch yaw) where a target grouping, for example of three targets is used such as the natural features formed by the two eyes 164, 165 and nose 166 of a human 167. These features are roughly at known distances from each other, the data from which can be used to calculate the approximate position and orientation of the human face. Using for example the photogrammetric technique of Pinkney described below, the full 6 degree of freedom solution of the human face location and orientation can be achieved to an accuracy limited by the ability of the camera image processing software utilized to determine the centroids or other delineating geometric indicators of the position of the eyes and nose, (or some other facial feature such as the mouth), and the accuracy of the initial imputing of the spacing of the eyes and their respective spacing to the nose. Clearly if a standard human value is used (say for adult, or for a child or even by age) some lessening of precision results, since these spacings are used in the calculation of distance and orientation of the face of human 167 from the camera 160.

Figure 1C:
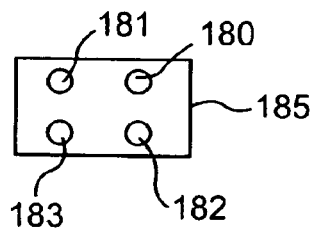

In another generally more photogrammetrically accurate case, one might choose to use four special targets (e.g., glass bead retro-reflectors, or orange dots) 180-183 on the object 185 having known positional relationships relative to each other on the object surface, such as one inch centers. This is shown in FIG. 1C, and may be used in conjunction with a pixel addressable camera such as described in FIG. 2 below, which allows one to rapidly determine the object position and orientation and track its movements in up to 6 degrees of freedom as disclosed by Pinkney U.S. Pat. No. 4,219,847 and technical papers referenced therein. For example, the system described above for FIGS. 1 and 2 involving the photogrammetric resolution of the relative position of three or more known target points as viewed by a camera is known and is described in a paper entitled "A Single Camera Method for the 6-Degree of Freedom Sprung Mass Response of Vehicles Redirected by Cable Barriers" presented by M. C. van Wijk and H. F. L. Pinkney to The Society of Photo-optical Instrumentation Engineers.

The stereo pair of cameras can also acquire a two view stereo image of the scene as well, which can be displayed in 3D using stereoscopic or auto-stereoscopic means, as well as transmitted or recorded as desired.

In many applications of the foregoing invention it is desirable not just to use a large screen but in fact one capable of displaying life size images. This particularly relates to human scaled images, giving a life-like presence to the data on the screen. In this way the natural response of the user with motions of hands, head, arms, etc., is scaled in "real" proportion to the data being presented.

FIG. 2

This embodiment and others discloses special types of cameras useful with the invention. In the first case, that of FIG. 2A, a pixel addressable camera such as the MAPP2200 made by IVP corporation of Sweden is used, which allows one to do many things useful for rapidly determining location of objects, their orientation and their motion.

Figure 2A:
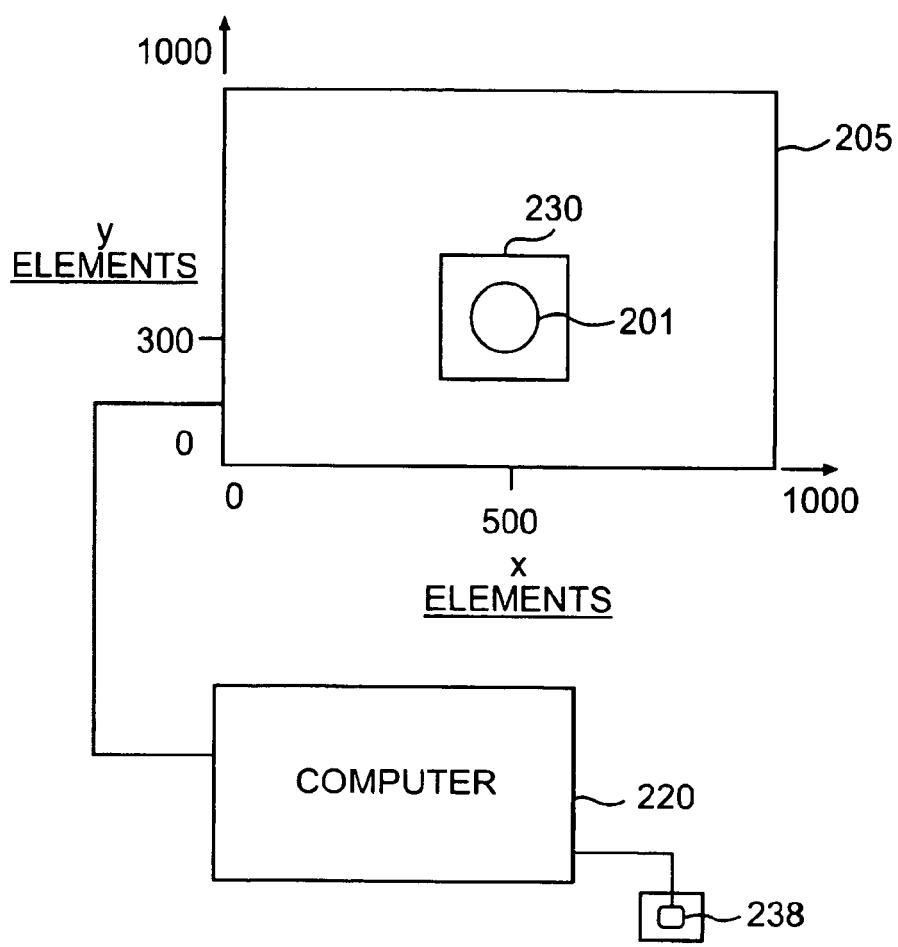
FIG. 2 illustrates object tracking embodiments of the invention employing a pixel addressable camera.

For example, as shown in FIG. 2A, an approximately circular image 201 of a target datum such as 180 on object 185 of FIG. 1C may be acquired by scanning the pixel elements on a matrix array 205 on which the image is formed. Such an array in the future will have for example 1000×1000 pixels, or more (today the largest IVP makes is 512×512. The IVP also is not believed to be completely randomly addressable, which some future arrays will be).

As an illustration, computer 220 determines, after the array 205 has been interrogated, that the centroid "x, y" of the pixel elements on which the target image lies is at pixel x=500, y=300 (including a sub-fraction thereof in many cases). The centroid location can be determined for example by the moment method disclosed in the Pinkney patent, referenced above.

The target in this case is defined as a contrasting point on the object, and such contrast can be in color as well as, or instead of, intensity. Or with some added preprocessing, it can be a distinctive pattern on the object, such as a checkerboard or herringbone.

Subsequent Tracking

To subsequently track the movement of this target image, it is now only necessary to look in a small pixel window composed of a small number of pixels around the target. For example the square 230 shown, as the new position x'y' of the target image cannot be further distant within a short period of time elapsed from the first scan, and in consideration of the small required time to scan the window.

For example, if the window is 100×100 pixels, this can be scanned in 1 millisecond or less with such a pixel addressing camera, by interrogating only those pixels in the window, while still communicating with the camera over a relatively slow USB serial link of 12 mb transmission rate (representing 12,000 pixel gray level values in one millisecond).

One thus avoids the necessity to scan the whole field, once the starting target image position is identified. This can be known by an initial scan as mentioned, or can be known by having the user move an object with a target against a known location with respect to the camera such as a mechanical stop, and then indicate that tracking should start either by verbally saying so with voice recognition, or by actuating a control key such as 238 or whatever.

It is noted that if the tracking window is made large enough, then it can encompass a whole group of datums, such as 180-183 on an object.

Figure 2B:
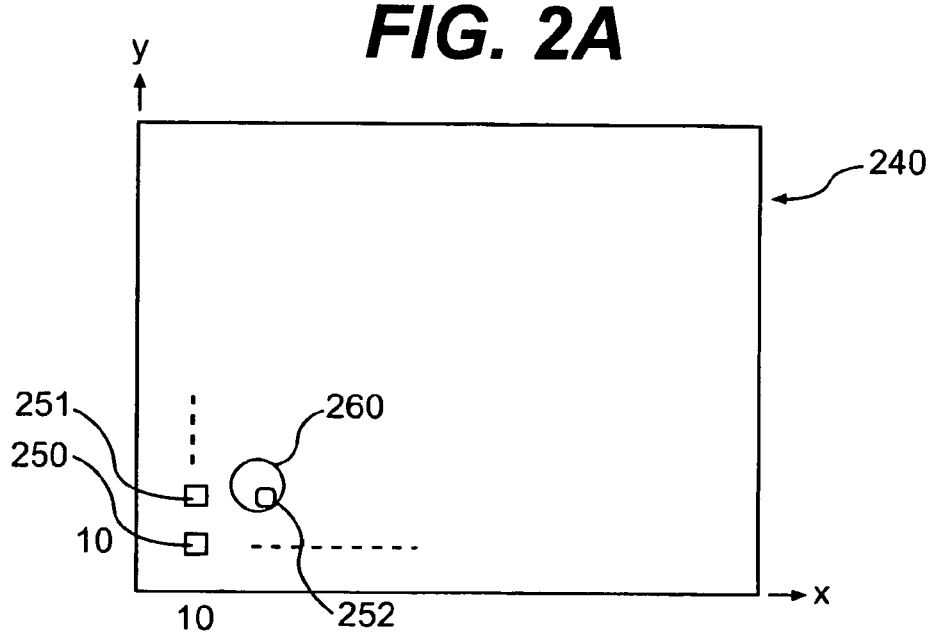
Figure 2C:
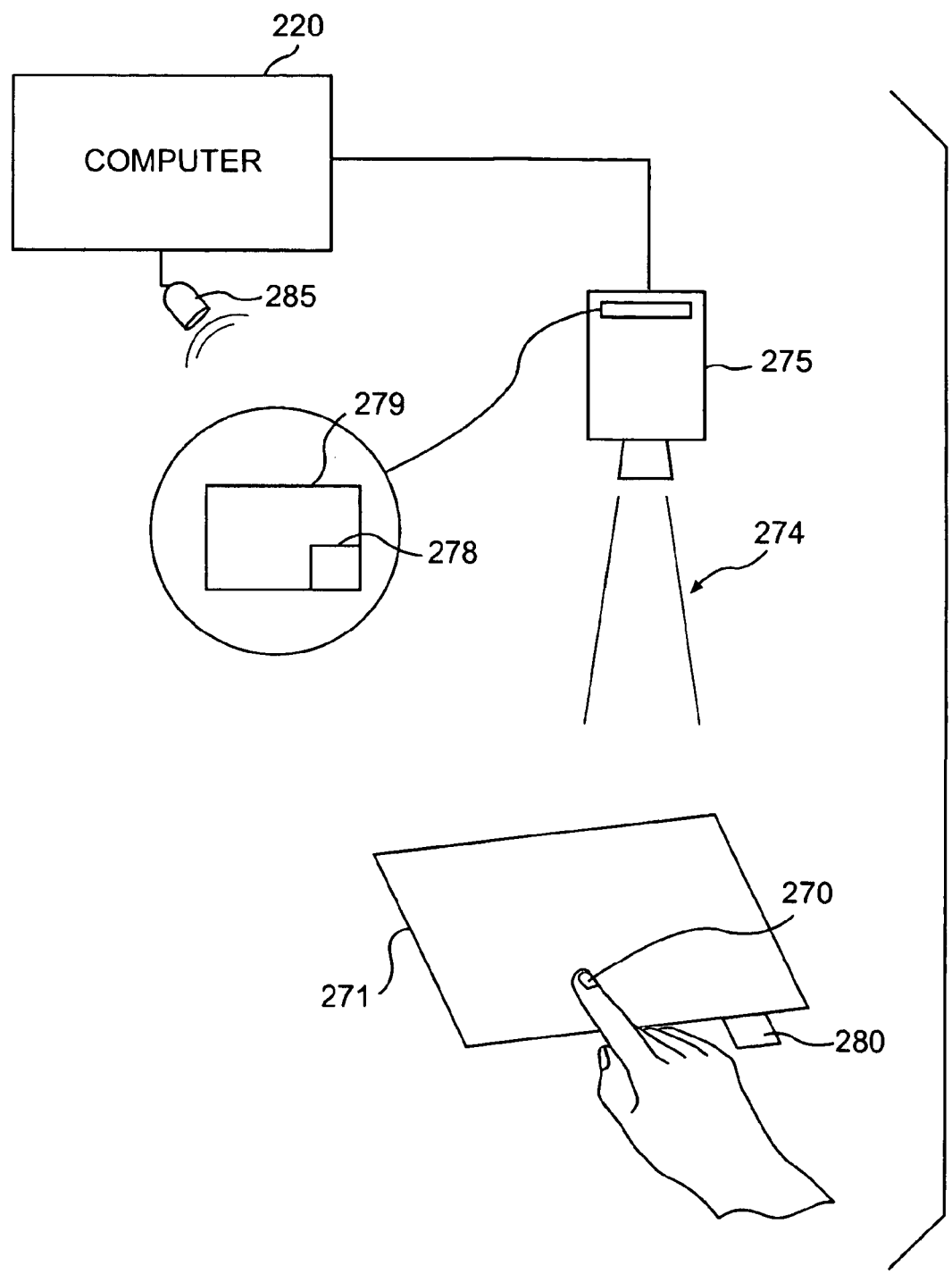

FIG. 2B Reduction in Acquisition Time

Another application of such a pixel addressing camera is shown in FIG. 2B. One can look at the whole field, x y of the camera, 240, but only address say every $10^{th}$ pixel such as 250, 251 and 252, in each direction, i.e., for a total 10,000 pixels in a field of 1 million (1000×1000, say).

In this case computer 220 simply queries this fraction of the pixels in the image, knowing apriori that the target image such as 260 will have an image size larger than 10×10 pixels, and must be detectable, if of sufficient contrast, by one of the queried pixels. (For smaller or larger target images, the number and spacing of queried pixels can be adjusted accordingly). This for example, allows one to find approximate location of targets with only $\frac{1}{100}$ the pixel interrogation time otherwise needed, for example, plus any gain obtained as disclosed above, by knowing in what region of the image to look (for example during tracking, or given some apriori knowledge of approximate location due to a particular aspect of the physical arrangement or the program in question).

Once a target has been approximately found as just described, the addressing can be optimized for that region of the image only, as disclosed in subsequent tracking section above.

Given the invention, the potential for target acquisition in a millisecond or two thus is achievable with simple pixel addressable CMOS cameras coming on stream now (today costing under $50), assuming the target points are easily identifiable from at least one of brightness (over a value), contrast (with respect to surroundings), color, color contrast, and more difficult, shape or pattern (e.g., a plaid, or herringbone portion of a shirt). This has major ramifications for the robustness of control systems built on such camera based acquisition, be they for controlling displays, or machines or whatever.

It's noted that with new 2000×2000 cameras coming on stream, it may only be necessary to look at every $15^{th}$ or $20^{th}$ pixel in each direction to get an adequate feel for target location. This means every $200^{th}$ to $400^{th}$ pixel, not enough to cause image rendition difficulties even if totally dark grey (as it might be in a normal white light image if set up for IR wavelengths only).

FIG. 2C

Another method for finding the target in the first place with limited pixel interrogation is to look at pixels near a home point where a person for example indicates that the target is. This could be for example, placing ones fingernail such as 270, whose natural or artificial (e.g., reflective nail polish) features are readily seen by the camera 275 and determined to be in the right corner of a pad 271 in FIG. 2C which approximately covers the field of view 274 of the camera 275. The computer 220 analyzes the pixels in the right corner 278 of the image field 279 representing the pad portion 271 with the camera 275, either continuously, or only when the finger for example hits a switch such as 280 at the edge of the pad, or on command (e.g., by the user pushing a button or key, or a voice message inputted via microphone 285 for example). After such acquisition, the target is then tracked to other locations in xy space of the pad, for example as described above. Its noted that it helps to provide a beep or other sound or indication when acquisition has been made.

Pick Windows in Real Time

Another aspect of the invention is that one can also pick the area of the image to interrogate at any desired moment. This can be done by creating a window of pixels with in the field to generate information, for example as discussed relative to a specific car dashboard application of FIG. 10.

Figure 2D:
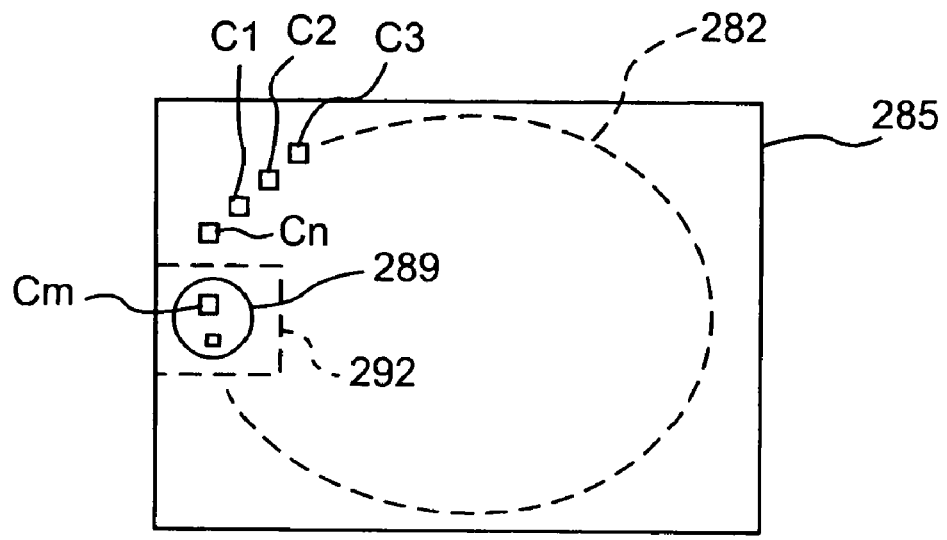

FIG. 2D—Scan Pattern

A pixel addressing camera also allows a computer such as 220 to cause scans to be generated which are not typical raster scans. For example circular or radial, or even odd shapes as desired. This can be done by providing from the computer the sequential addresses of the successive pixels on the camera chip whose detected voltages are to be queried.

A circular scan of pixels addressed at high speed can be used to identify when and where a target enters a field enclosed by the circular pixel scan. This is highly useful, and after that, the approximate location of the target can be determined by further scans of pixels in the target region.

For example consider addressing the pixels $c1\ c2\ c3\ldots cn$ representing a circle 282 at the outer perimeter of the array, 285, of 1000×1000 elements such as discussed above. The number of pixels in a full circle is approximately 1000 pi, which can be scanned even with USB (universal serial bus) limits at 300 times per second or better. For targets of $\frac{1}{100}$ field in width, this means that a target image entering the field such as circular target image 289 (which is shown intersecting element cm and its neighbors) would have to travel $\frac{1}{100}$ the field width in 0.0033 seconds to be totally missed in a worst case. If the image field corresponds to 20 inches in object field width this is 0.2 inches×300/sec or 60 inches/second, very fast for human movement, and not likely to be exceeded even where smaller targets are used.

Alternative shapes to circular "trip wire" perimeters may be used, such as squares, zig-zag, or other layouts of pixels to determine target presence. Once determined, a group of pixels such as group 292 can be interrogated to get a better determination of target location.

FIG. 3

Since many applications of the invention concern, or at least have present a human caused motion, or motion of a part of a human, or an object moved by a human, the identification and tracking problem can be simplified if the features of interest, either natural or artificial of the object provide some kind of change in appearance during such motion.

FIG. 3 illustrates tracking embodiments of the invention using intensity variation to identify and/or track object target datums. In a simple case, a subtraction of successive images can aid in identifying zones in an image having movement of features as is well known. It is also useful to add pixel intensities of successive images in computer 220 for example. This is particular true with bright targets (with respect to their usual surroundings) such as LEDs or retro-reflectors. If the pixels in use by the camera are able to gather light preferentially at the same time a special illumination light is on, this will accentuate the target with respect to background. And if successive frames are taken in this way, not only will a stationary image of the special target build up, but if movement takes place the target image then will blur in a particular direction which itself can become identify-able. And the blur direction indicates direction of motion as well, at least in the 2-D plane of the pixel array used.

Another form of movement can take place artificially, where the target is purposely moved to provide an indication of its presence. This movement can be done by a human easily by just dithering ones finger for example (if a portion of the finger such as the tip is the target in question), or by vibrating an object having target features of interest on it, for example by moving the object up and down with ones hand.

Figure 3A:
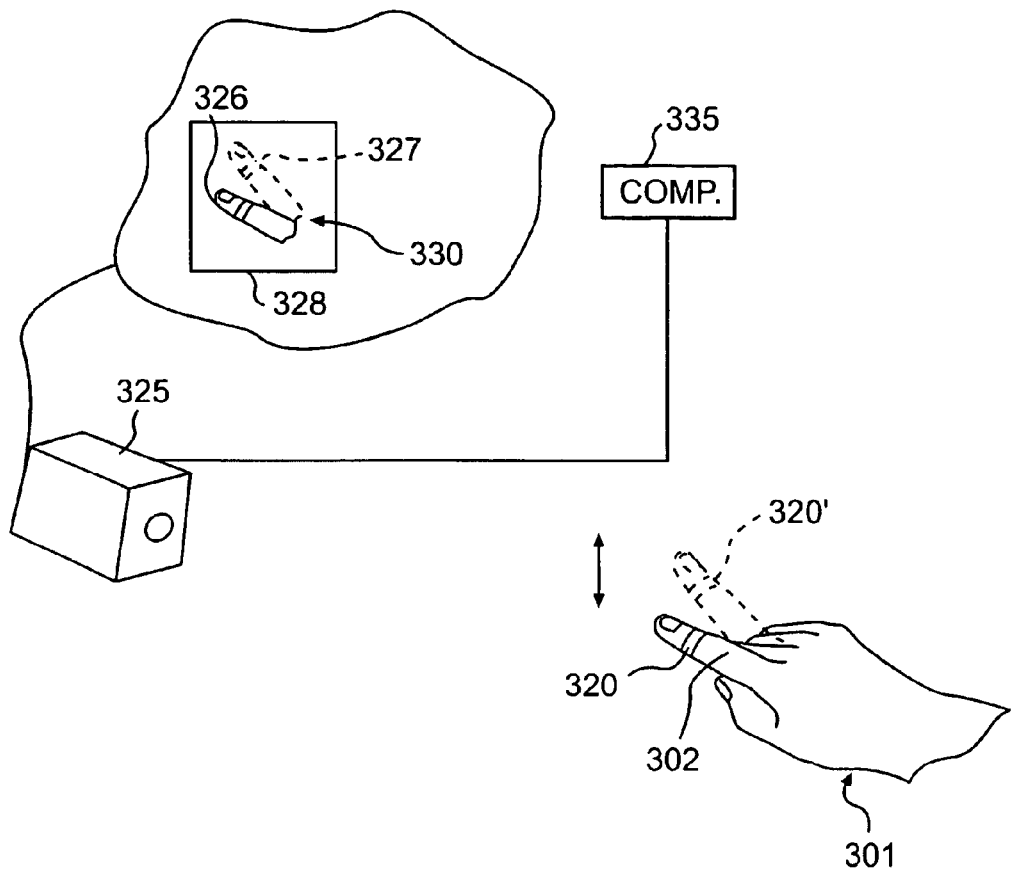
FIG. 3 illustrates tracking embodiments of the invention using intensity variation to identify and/or track object target datums.

For example consider FIG. 3A, where a human 301 moves his finger 302 in a rapid up and down motion, creating different image positions sequentially in time of bright target ring 320, 320' on his finger, as seen by camera 325. If the camera can read quickly enough each of these positions such as 326 and 327 in image field 328 can be resolved, other wise a blur image such as 330 is registered on the camera and recorded in the computer 335.

Instead of using ones finger, it is also possible to create movement of a target for example with a tuning fork or other mechanism mechanically energizing the target movement, on what otherwise might be a static object say. And it is possible for the human, or a computer controlling the movement in question to create it in such a manner that it aids identification. For example, a certain number of moves of ones finger (e.g., 4), or 2 moves/sec of ones finger, or horizontal moves of ones finger etc., any or all of these could indicate to the computer upon analysis of the camera image, that a target was present.

The invention comprehends this as a method for acquiring the datum to be tracked in the first place, and has provided a camera mechanism for tracking fast enough not to lose the data, assuming a sufficiently distinct feature. For example, it is desirable to not require sophisticated image processing routines and the like if possible, to avoid the time it takes to execute same with affordable equipment. And yet in many scenes, finding a target cant be done easily today without some aid, either a high contrast target (contrasting brightness or color or both, for example). Or the aid can be movement as noted, which allows the search for the target to be at least localized to a small region of the field of view, and thence take much less time to run, even if a sophisticated algorithm is employed.

Figure 3B:
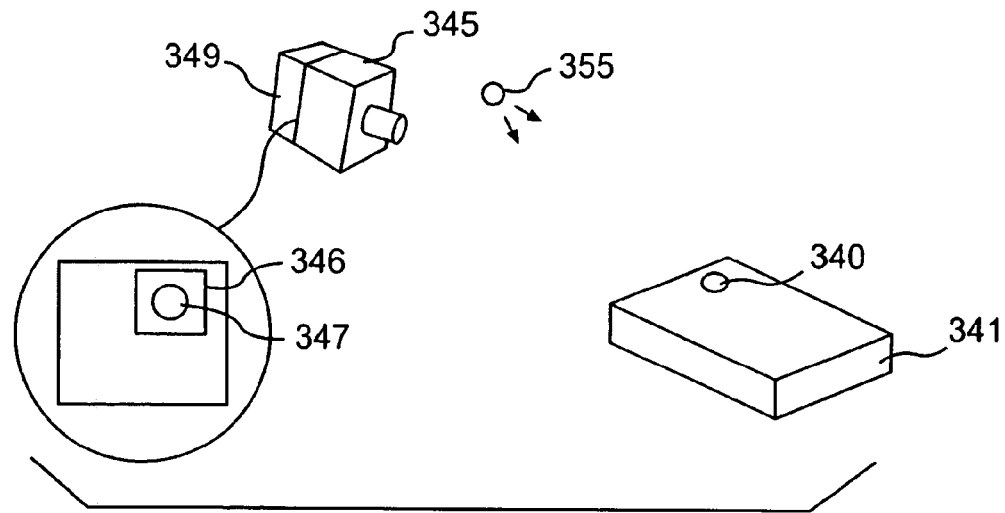

FIG. 3B illustrates an embodiment wherein a target which blinks optically is used. The simplest case is a modulated LED target such 340 on object 341 shown. Successive frames taken with camera 345 looking at pixel window 346 at 300 scans of the pixels within the window per second where the image 347 of the LED target is located, can determine, using computer 349 (which may be separate from, or incorporated with the image sensor), 5 complete blinks of target 340, if blinked at a 60 hz rate. Both blink frequency, blink spacing, blink pulse length can all be determined if the scan rate is sufficiently faster than the blink rate, or pulse time.

It should be noted that if the target 340 is a retro-reflector as in FIG. 1, with an illumination source such as 355 near the axis of the camera, then the LEDs (or other sources) of the illuminator can be modulated, causing the same effect on the target.

Figure 3C:
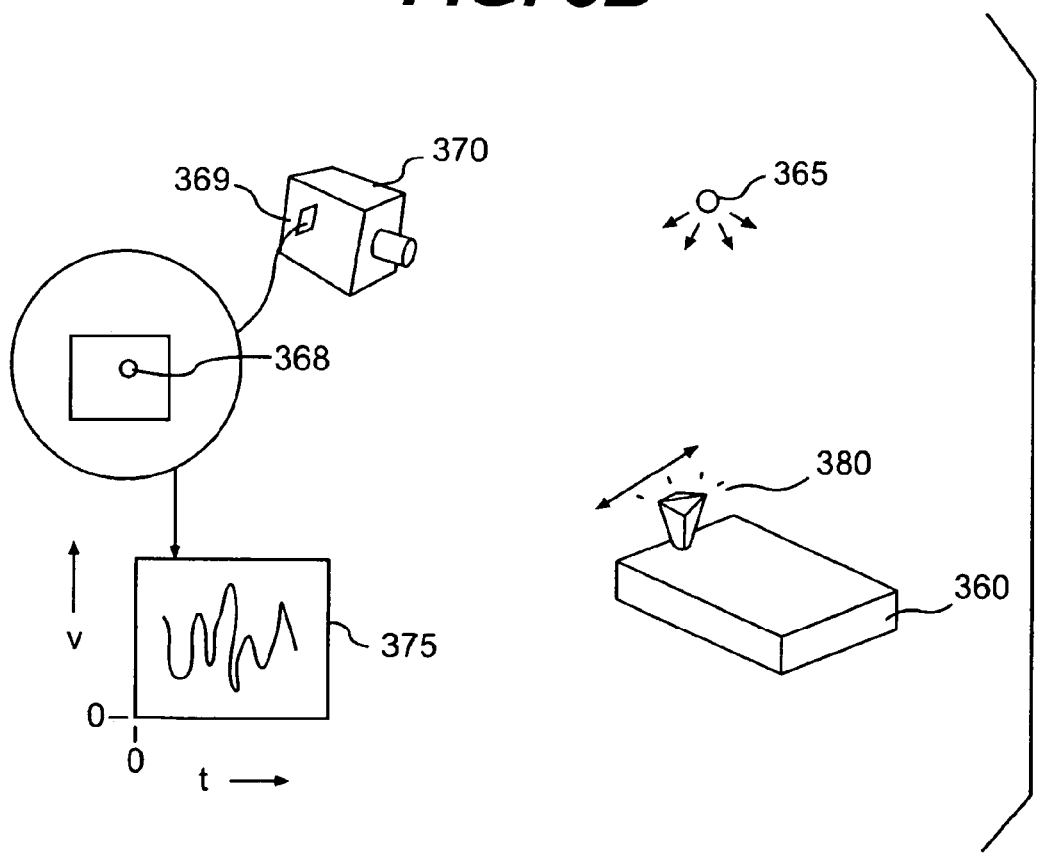

Somewhat more sophisticated is the situation shown in FIG. 3C where a target 380 (on object 360) illuminated by a light source 365 provides a time variant intensity change in the camera image 368 obtained by camera 370 as the target moves its position and that of the image. This can be achieved naturally by certain patterns of material such as herringbone, or by multifaceted reflectors such as cut diamonds (genuine or glass), which "twinkle" as the object moves. A relative high frequency "twinkle" in the image indicates then the presence of the target in that area of the image in which it is found.

When analog sensors such as PSD (position sensing diode) sensor 369 described in a copending application is used in addition to, or instead of a matrix array in camera 370, the variation in light intensity or twinkle can be obtained directly from the detected output voltage from the signal conditioning of the sensor as shown in trace 375 corresponding to the movement of diamond target 380 a distance in the camera field. From the PSD one can also determine the position of the detected target image, theoretically at least independent of the intensity fluctuation.

For digital array detectors, the intensity variation can also be detected by subtracting images and observing the difference due to such variation. Such images need to be taken frequently if the twinkle frequency is high, and this can cause problems unless high speed camera scanning is possible. For example, in a twinkle mode, a pixel addressable camera using the invention herein could scan every $5^{th}$ pixel in both x and y. This would allow a 1000 frame per second operation of a camera which would normally go 40 frames per second. Such a rate should be able to capture most twinkle effects with the assumption that the light field changes on more than 25 pixels. If less, then scan density would need to be increased to every $3^{rd}$ pixel say, with a corresponding reduction in twinkle frequency detection obtainable.

FIG. 4

Figure 4A:
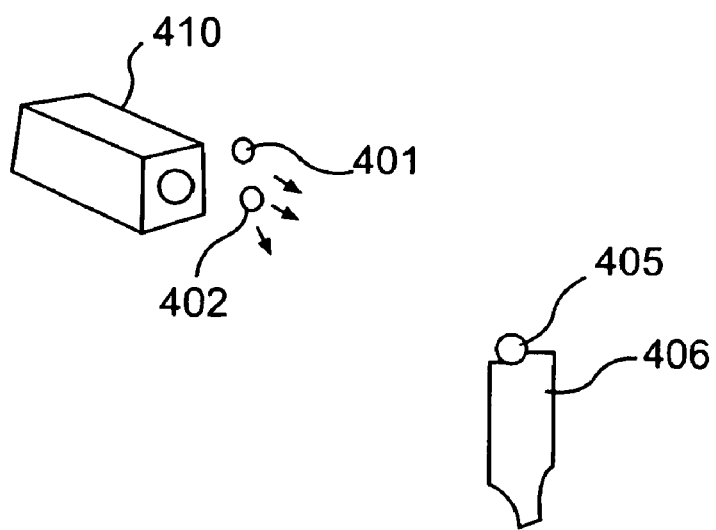
FIG. 4 illustrates tracking embodiments of the invention using variation in color to identify and/or track object target datums.

FIG. 4A illustrates identification and tracking embodiments of the invention using color and color change in a manner similar in some aspects to the intensity variation from object datums described above.

Color can be used as has been noted previously to identify a target, as can a change in color with time. For example, a target can change its color in order to identify itself to successive interrogations of pixels on a color TV camera. This can be accomplished by having a retro-reflector which is illuminated in succession by light from different colored LEDs for example, in the arrangement of FIG. 1. For example red led 401 illuminates retro reflector target 405 on object 406 during frame 1 (or partial frame, if not all pixels addressed) taken by camera 410. Then yellow led 402 illuminates target 405 on the next frame, and so forth. For any reading of successive frames, one point in the image will appear to distinctly change color, while all other points will be more or less the same due to the room lighting overwhelming the led source illumination and the natural color rendition of the objects themselves.

To return color variation when moved, one can employ a target which changes color naturally as it moves, even with illumination of constant color. Such a target can contain a diffractive, refractive, or interference based element, for example, a reflective diffraction grating for example, which splits white light illumination into colors, which are seen differently as the target moves and changes angle with respect to the observer and/or illumination source.

Figure 4B:
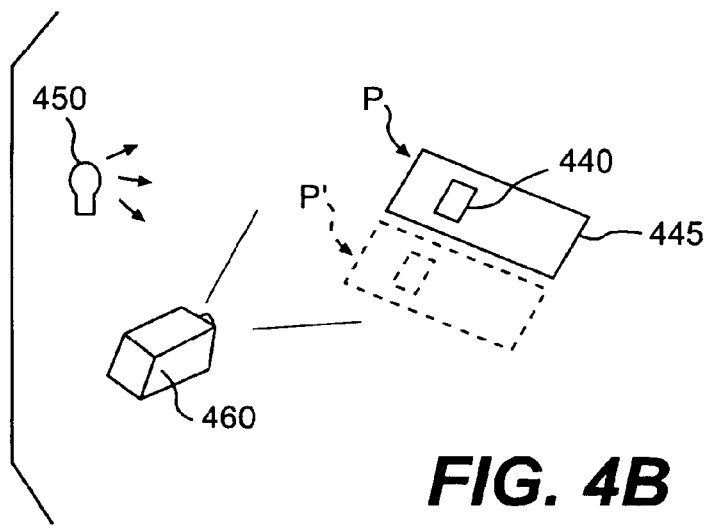

For example, consider FIG. 4B showing reflective grating 440 on object 445 at initial position P. When illuminated by white light for example from lamp 450, it reflects the spectrum such that when the object has moved to a new position P' the color (or colors, depending on the grating type, and angles involved) returning to camera 460 is changed. Such gratings can be purchased from Edmund Scientific company, and are typically made as replicas of ruled or holographic gratings.

Some types of natural features which change color are forms of jewelry which have different colored facets pointing in different directions. Also some clothes look different under illumination from different angles. This could be called then "color twinkle".

FIG. 5

FIG. 5 illustrates special camera designs for determining target position in addition to providing normal color images. As was pointed out in a co-pending application, it may be desirable to have two cameras looking at an object or area one for producing images of a person or scene, the other for feature location and tracking. These may be bore-sighted together using beam splitters or the like to look at the same field, or they may just have largely overlapping image fields. The reason this is desirable is to allow one to obtain images of activity in the field of view (e.g., a human playing a game) while at the same time ideally determine information concerning position or other aspects of features on the human or objects associated with him.

It is now of interest to consider a matrix array chip equipped with a special color filter on its face which passes a special wavelength in certain pixel regions, in addition to providing normal color rendition via RGB or other filtering techniques in the remaining regions. The chip could be pixel addressable, but does not have to be.

Figure 5A:
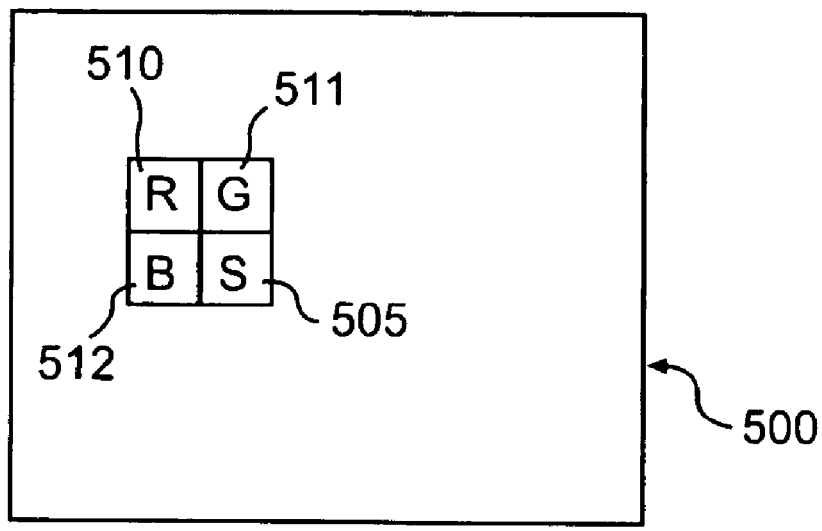
FIG. 5 illustrates special camera designs for determining target position in addition to providing normal color images.

Version FIG. 5A

One version would have one special pixel filter such as 505, for each square group of 4 pixels in an array 500 (one special pixel filter 505, and 3 pixels, 510-512 filtered for RGB (red green blue) or similar, as is commonly used now for example. In one functional example, the special pixel 505 is purposely not read during creation of the normal image of a scene, but rather read only on alternate frames (or as desired) to determine target locations. If the array can be addressed pixel wise, the actual time lost doing this can be low. Since 25% of the pixels are effectively dead in forming the image in this example, and assuming all pixels are of equal area (not necessarily required), then 25% of the image needs to be filled in. This can be done advantageously in the image displayed, by making the color and intensity of this pixel the same as the resultant color and average intensity value of the other 3 in the cluster.

Figure 5B:
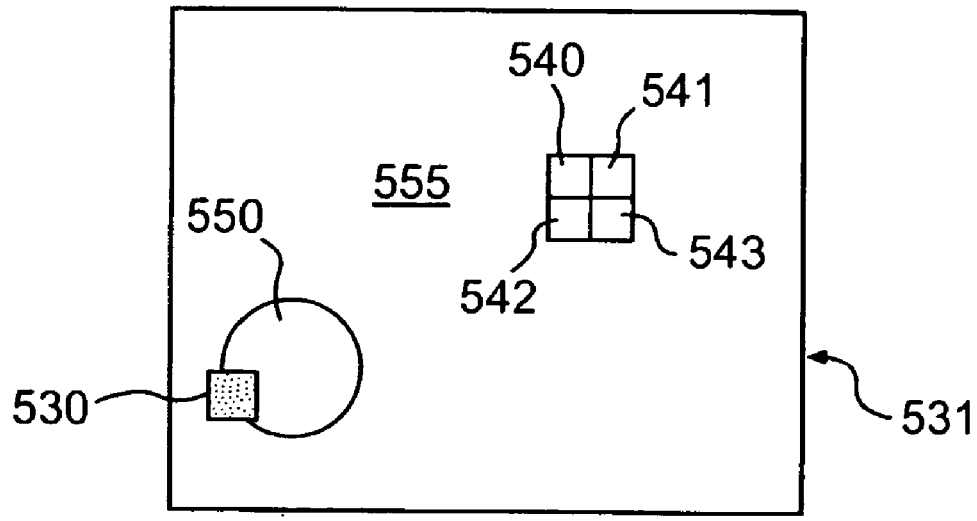

Version FIG. 5B

In this version, related to FIG. 2 above, and shown in FIG. 5b, isolated pixels such as 530 (exaggerated in size for clarity) on array 531 or clusters of pixels such as 540-543, are used to rapidly find a target with low resolution, such as round dot target image 550. These pixels can ideally have special filters on their face, for example having near IR bandpass filters (of a wavelength which can still be seen by the camera, typically up to 1 um wavelength max). If takes only a few pixels to see the rough presence of a target, then in an image field of 1000×1000 pixels there could be one or more target images occupying 10×10 pixels or more. Thus in any group of 10×10, you could have 5 near IR filtered receptive pixels say, i.e., only 5% of the total pixel count but sufficient to see the IR targets location to a modest accuracy. Once found, one can also use the "normal" pixels on which the target image also falls to aid in more precise determination of its location, for example using pixel group 555 composed of numerous pixels.

In short by having a camera with certain pixels responsive to selected wavelengths and/or scanned separately one can very rapidly scan for target features, then when found, take a regular picture if desired. Or just take regular pictures, until the necessity arises to determine target location.

Similarly the special filtered pixels such as 505 or 530 could be laser wavelength bandpass filtered for this purpose, used by the array for preferentially detecting laser light projected on an object (while ignoring other wavelengths). In a normal image, such a pixel would be nearly black as little white light passes (except that centered on the laser wavelength). To provide a normal picture using such a camera, the special IR or laser wavelengths pixels readings would be filed in with values and colors of light from the surrounding regions.

Such a laser wavelength filter can be extremely effective, even if a relatively weak laser is used to illuminate a large area, especially where retro-reflectors are used, and the light returned is concentrated by 1000 times or more.

FIG. 6

The embodiments above have dealt with finding just one target, and generally with just one camera, even though two or more cameras may be used for stereo imaging. Where stereo pairs of cameras are used, clearly each camera must see the target, if range via image disparity (the shift in location of a feature in the image in two camera views separated by a baseline) is to be determined.

Using the invention, one camera can be considered a master, the other a slave. The master camera determines target location by any of the means described above. Then the slave need only look at the expected pixel location of the target assuming some a priori knowledge of range which can come from previous target readings, or known range zones where the target has to lie in a given application.

Consider cameras 600 (master) with lens 603 and 601 (slave) having lens 604, the axes of the two cameras separated by baseline 602 and with interfaced to computer 605. The image of target 610 on object 615 is formed at position 620 on array 630 of camera 600, and at position 621 on array 631 of camera 601. The difference in position x in the direction of the baseline, in this simple situation is directly proportional to range z. The knowledge then of target image position 620 found by interrogating some or all of the pixels of camera 600 can as mentioned be used to more rapidly find image 621 in the image field of the "slave" camera 601, and thus the z location of the target 610.

For example if range is known to be an approximate value of z, one can look in the image field of the camera 601 along a line of points at a calculated value x away from the edge of the field, assuming 620 has been found to lie as shown near the corresponding edge of the field of camera 600.

Figure 6:
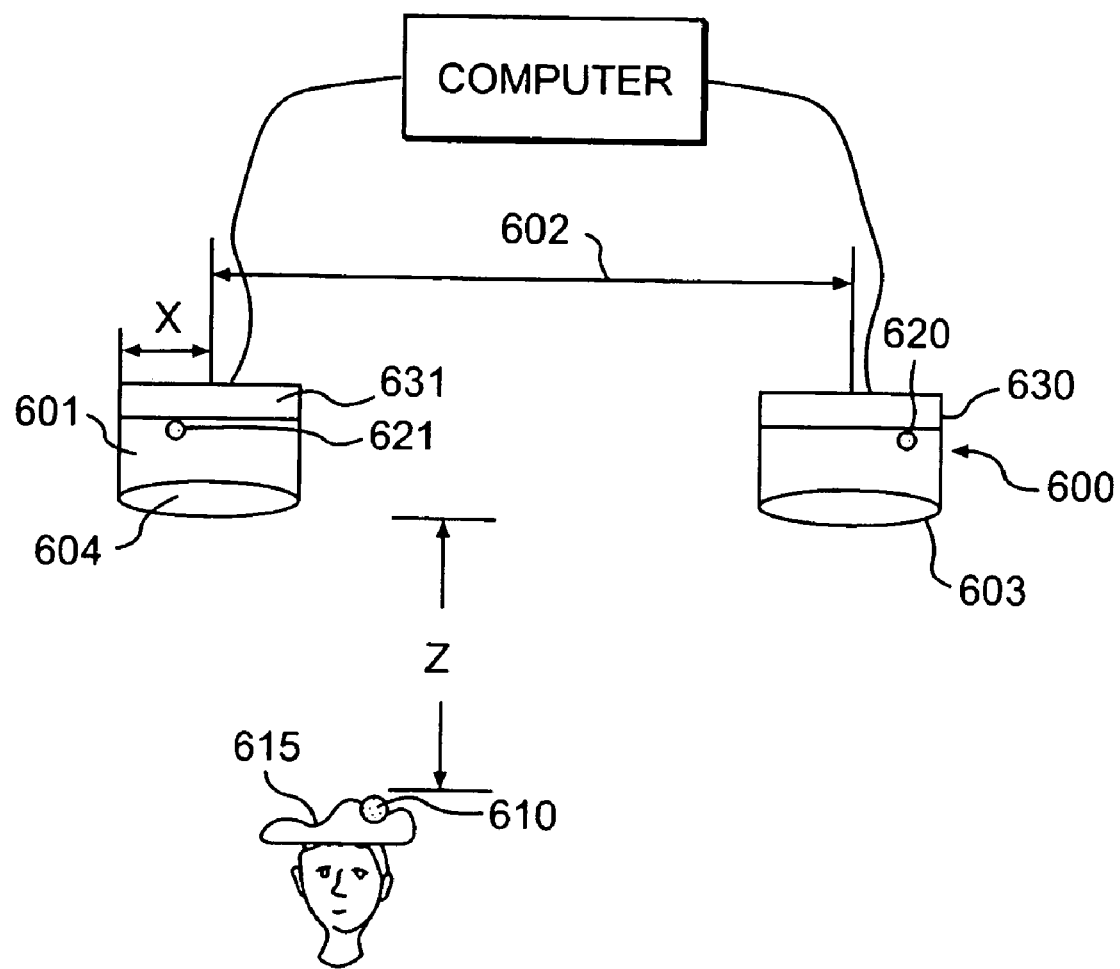
FIG. 6 identification and tracking with stereo pairs.

Two or more cameras may be used for stereo image analysis including object range and orientation data as discussed in FIGS. 1 and 6. Range can also be determined via triangulation with a single camera and one target if projected on to the object in question at an angle to the camera axis from a laser say, or by using a single camera and 3 or more points on an object whose relative relationship is known (including the case of a line of points and an external point).

FIG. 7

As stated above, the TV camera of the invention can be used to see either natural or artificial features of objects. The former are just the object features, not those provided on the object especially for the purpose of enhancing the ability to determine the object location or other variable using computer analysis of TV camera images. Such natural features, as has been pointed out in many of the co-pending referenced applications, can be holes, corners, edges, indentations, protrusions, and the like of fingers, heads, objects held in the hand, or whatever.

But using simple inexpensive equipment it is often hard to determine the presence or location of such features in a rapid reliable enough manner to insure function of the application in question. In this case, one can employ one or more artificial features, provided on the object by attaching a artificial target onto the object, or manufacturing the object with such a target.

At least three types of artificial features can be employed.
1. The first is to provide special features required for object location, or orientation determination. Such a special feature can be of an optically contrasting material at the wavelength used to that of the object, for example a bright color, or a retroreflector;
2. The second is to provide one artificial feature (typically capable of more easily being found in an image than natural features of the object), and by finding it, localize to the region of that target environs the problem of finding any other features needed nearby; and
3. The third is to find an artificial feature on an object that actually by its shape, location, or coded features, provides a guide to the location of natural or other artificial features which are to be sensed in order to determine position or orientation of the same or related objects. This has been dubbed by me a co-target in co-pending applications incorporated by reference.

Figure 7:
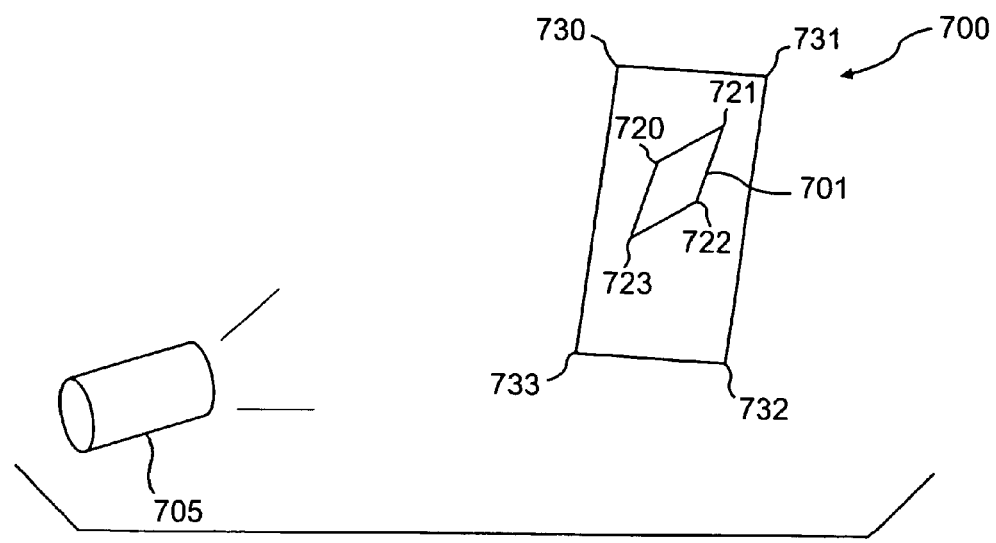
FIG. 7 illustrates use of an indicator or co-target.

As shown in FIG. 7, object 700 has co-target 701 at one end, visible to camera 705. The co-target in this particular instance is a diamond shape, and is of high contrast for easy acquisition. For example it could be a yellow plastic retroreflector formed of molded corner cubes similar to those used on cars for taillights and other safety purposes.

The diamond shape in this case is significant for two reasons. First it is unusual relative to the object or background when used in the context intended, and makes the target still more identifiable (that is novel color, shape and brightness are all present). In addition, in this particular instance it has been chosen that a diamond shape, should indicate that the corners of the object are to be used for 6 axis position and orientation determination and that the choice of color for example, signifies that the object corners are within some predetermined distance from the target. If desired the target location on the object can also point to the corners. For example, in the drawing, the four corners of the diamond, 720-723, point in the general direction of the four corners 730-733 of the rectangular object 700.

FIG. 8

The invention herein and disclosed in portions of other copending applications noted above, comprehends a combination of one or more TV cameras (or other suitable electro-optical sensors) and a computer to provide various position and orientation related functions of use. It also comprehends the combination of these functions with the basic task of generating, storing and/or transmitting a TV image of the scene acquired either in two or three dimensions.

Figure 8A:
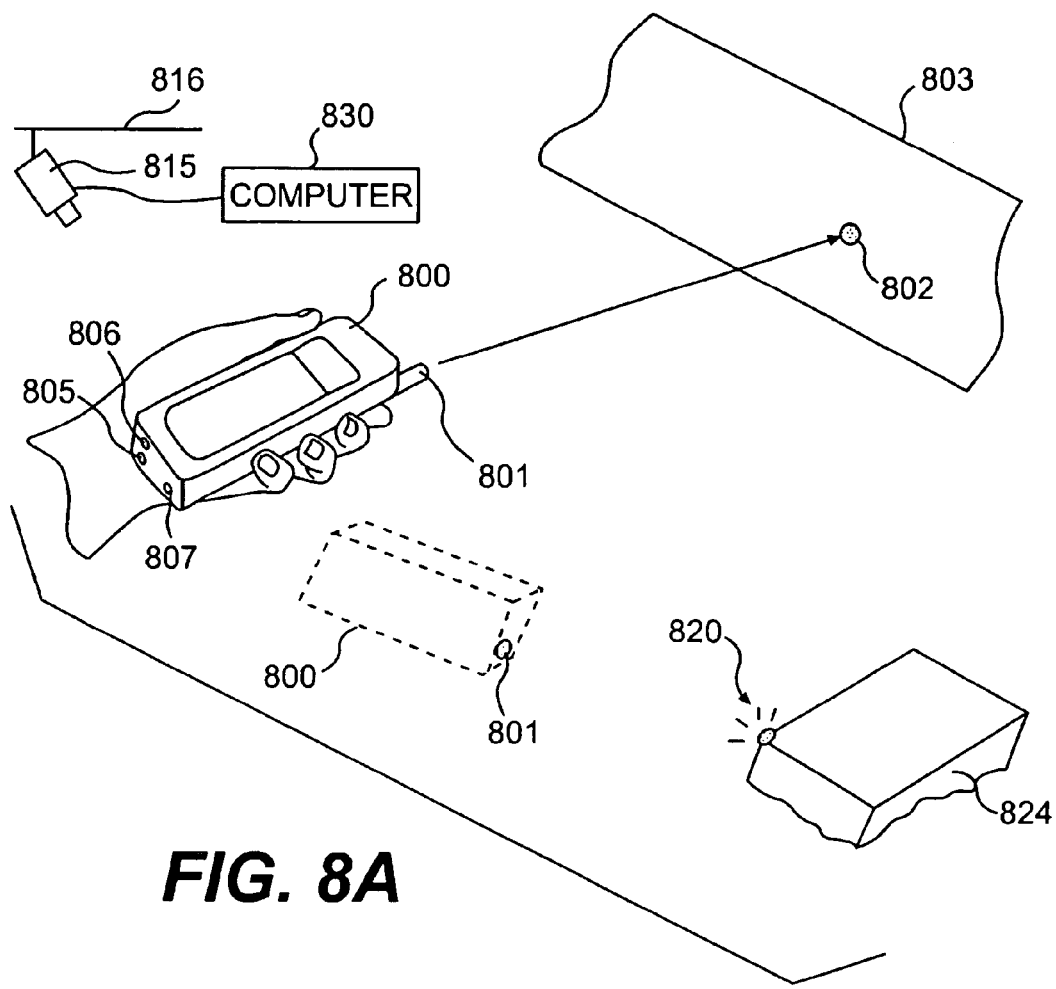
FIG. 8 illustrates control of functions with the invention, using a handheld device which itself has functions.

FIG. 8A illustrates control of functions with the invention, using a handheld device which itself has functions (for example, a cell phone). The purpose is to add functionality to the device, without complicating its base function, and/or alternatively add a method to interact with the device to achieve other purposes.

The basic idea here is that a device which one holds in ones hand for use in its own right, can also be used with the invention herein to perform a control function by determining its position, orientation, pointing direction or other variable with respect to one or more external objects, using an optical sensing apparatus such as a TV camera located externally to sense the handheld device, or with a camera located in the handheld device, to sense datums or other information external for example to the device.

This can have important safety and convenience aspects to it, particularly when the device is used while driving a car or operating other machinery. To date voice recognition has been the only alternative to keying data in to small handheld devices, and voice is limited in many cases very limited if some physical movement is desired of the thing being communicated with.

Figure 14A:
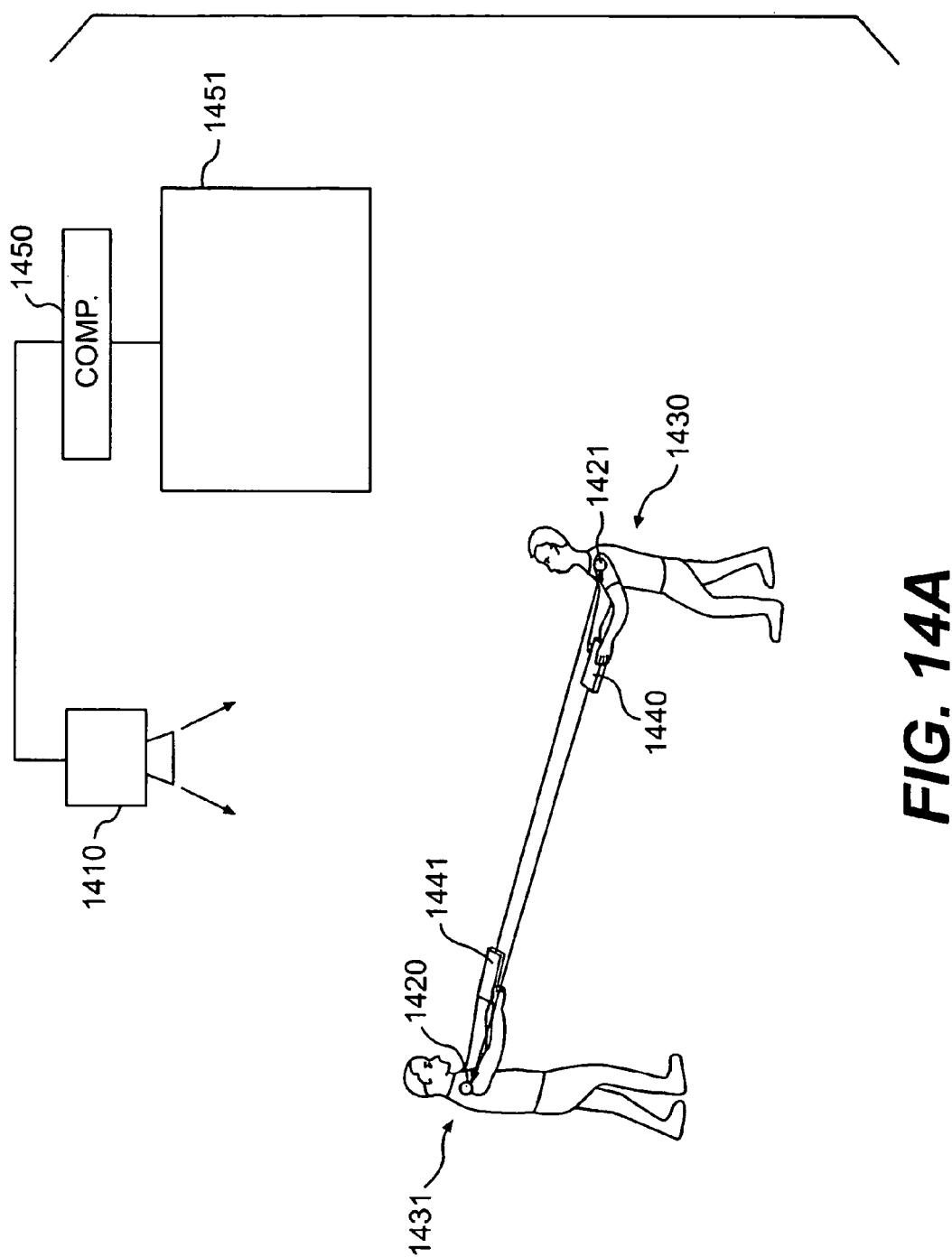
FIG. 14 illustrates a laser pointer or other spot designator embodiment of the invention.
Figure 14B:
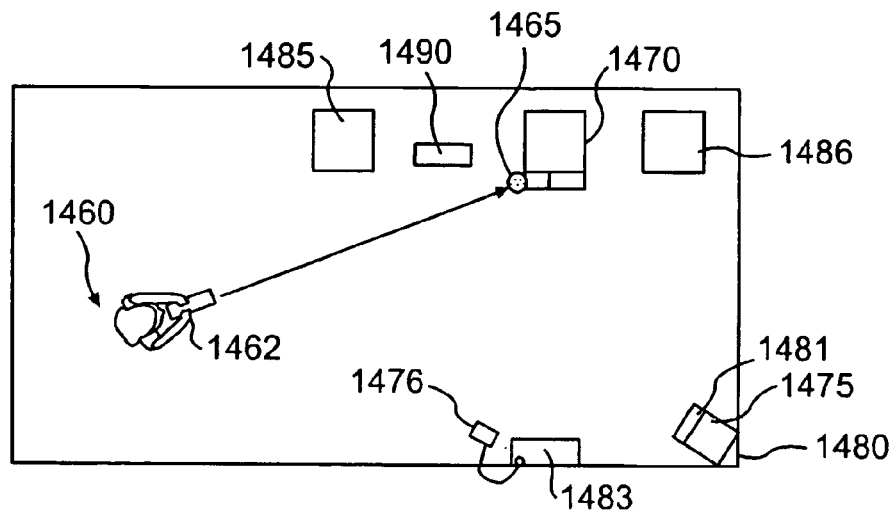
Figure 14C:
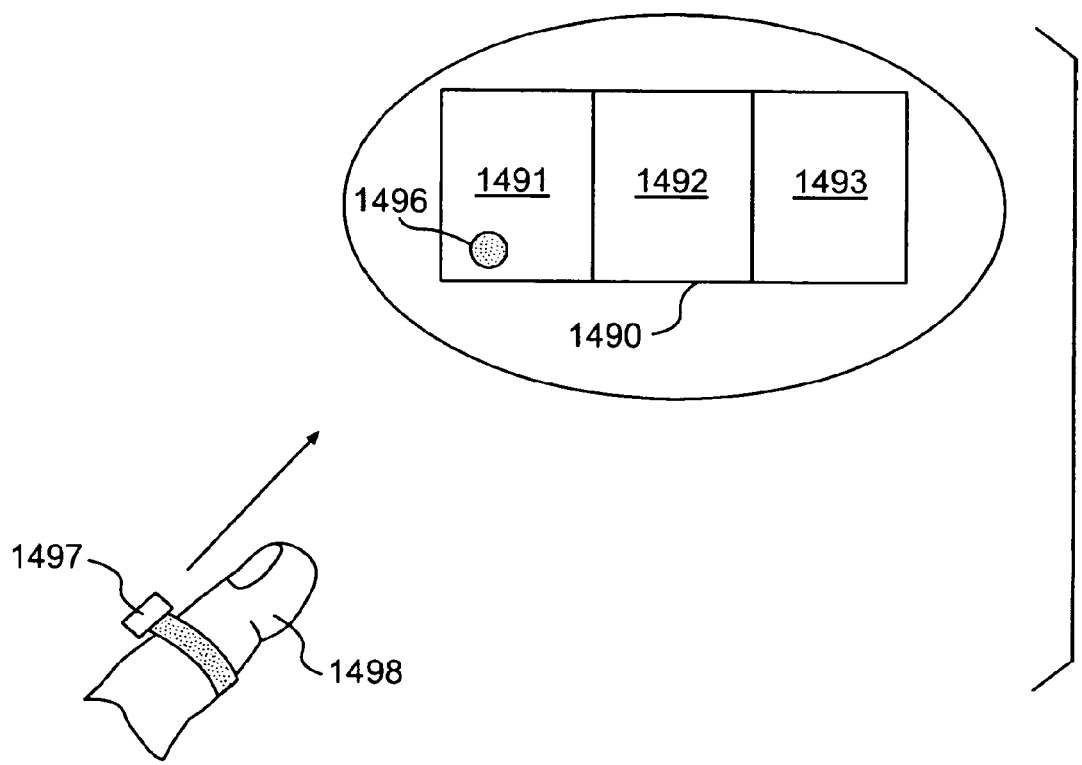

A cellular phone 800 held in the hand of a user can be used to also signal functions in a car using a projected laser spot from built in laser spot projector 801 as in FIG. 14, in this case detected by detector 802 on the dashboard 803. Alternatively and or in conjunction, one may use features such as round dot targets 805-807 on the cell phone which are sensed, for example, by a TV camera 815 located in the car headliner 816 or alternatively for example in the dashboard (in this case the targets would be on the opposite end of the cell phone). More than one set of targets can be used, indeed for most generality, they would be an all sides which point in any direction where a camera could be located to look at them.

Remote control units and dictating units are also everyday examples of some devices of this type which can serve control purposes according to the invention. One of the advantages here is that it keeps the number of switches etc on the device proper to a minimum, while allowing a multitude of added functions, also in noisy environments where voice recognition could be difficult or undesirable for other reasons.

Use of specialized target datums or natural features of devices held in the hand, or used with cameras on such devices, allows photogrammetric techniques such as described in FIG. 1 to be used to determine the location in 6 degrees of freedom of the device with respect to external objects.

As one illustrative example, to signal a fax unit 824 in the car to print data coming through on the phone, the user just points (as illustrated in position 2) the cell phone toward the fax, and the TV camera 815 scans the images of targets 805-807 on the face toward the camera, and the computer 830 connected to the camera analyzes the target images (including successive images if motion in a direction for example is used as an indicator, rather than pointing angle for example), determines the cell phone position and/or orientation or motion and commands the fax to print if such is signaled by the cell phone position orientation or motion chosen. The knowledge in space of the cell phone location and its pointing direction (and motion as pointed out above) provides information as to the fact that the fax was the intended target of the effort. Such data can be taught to the system, after the fact even if the fax or any other item desired to be controlled is added later.

Another version has a camera and requisite computer (and or transmission capability to an external computer) in the handheld device, such as a cell phone or whatever. When pointed at an object, the camera can acquire the image of the object and/or any natural features or special datums on the object which are needed to perform the function desired.

Figure 8B:
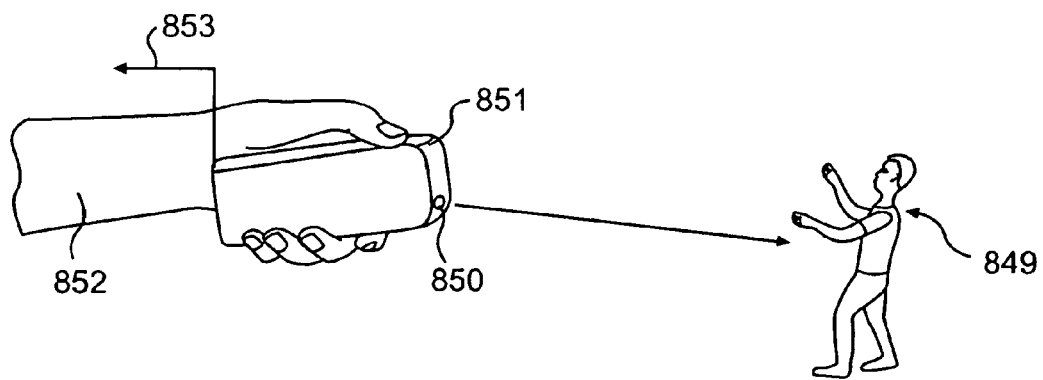

One function is just to acquire an image for transmission via for example the cell phones own connection. This is illustrated in FIG. 8B, where an image of object 849 acquired by camera 850 of cell phone 851 held by user 852 is transmitted over mobile phone link 853 to a remote location and displayed, for example. While this image can be of the user, or someone or something of interest, for example a house, if a real estate agent is making the call, it is also possible to acquire features of an object and use it to determine something.

For example, one purpose is recognition, for example one can point at the object, and let the computer recognize what it is from its TV image. Or point around in space taking multiple TV frames aiming in different directions, and when computer recognition of a desired object in one of the images takes place, transmit certain data to the object. Or it can be used to acquire and transmit to remote locations, only that data from recognized objects.

Thus the invention can provided on a hand held object for a variety of purposes, To take images of things;

To determine datums on things; and

To automatically read things.

The combination of any or all of these functions in addition with other object functions such as hand held cell phones, dictation units, telephones, wearable computer devices and the like.

An alternative, shown with phantom lines in FIG. 8A, to the some aspects of the above described operation of the embodiment is to use a laser pointer 801 in for example a cell phone to designate say the fax machine as shown. Then the TV camera 815 simply detects the presence of the laser pointer projected spot 820 on the fax, and via computer memory it is known that this is a device to be energized or connected in connection with the cell phone.

The camera located in a handheld device can also be used to point at a TV screen, such as that on the dashboard of a car, and to utilize data presented there for some purpose. For example, if pointed at a screen saying email message number 5, the camera of the device can be used to obtain this image, recognize it through known character recognition techniques, and process it for transmission if desired. Or it might just say the message to the user of the phone through the speaker of the cell phone. Such a technique is not required if means exist to directly transmit the incoming information to the cell phone, but this may not be possible.

FIG. 9

Figure 9:
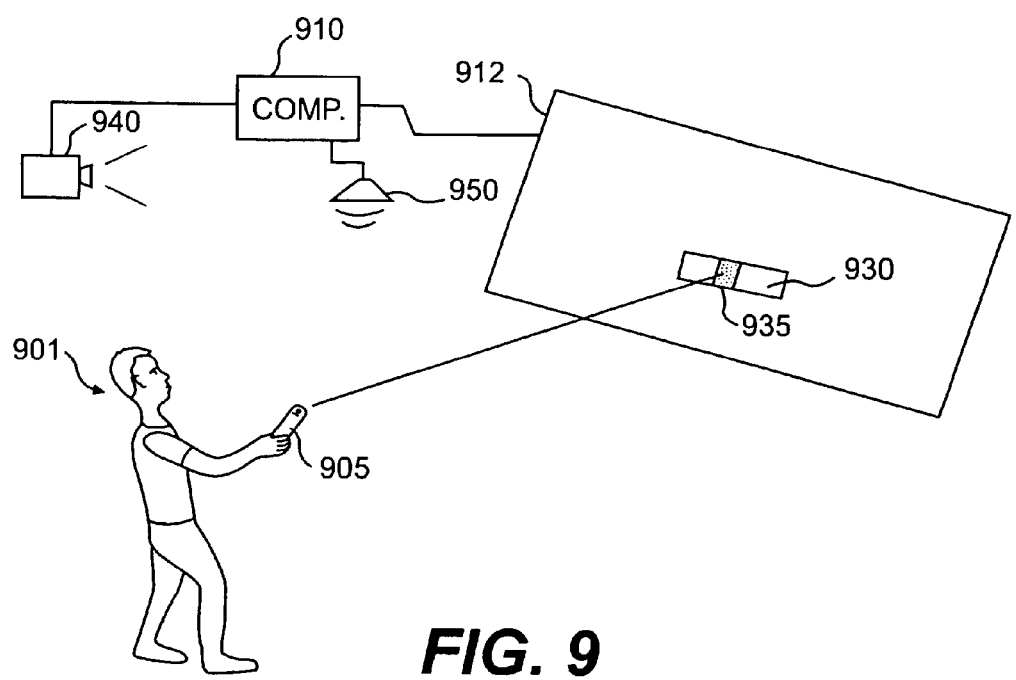
FIG. 9 illustrates pointing at an object represented on a screen using a finger or laser pointer, and then manipulating the represented object using the invention.

FIG. 9 illustrates pointing at a displayed image of an object represented on a screen using a finger or laser pointer, and then manipulating the represented object or a portion thereof using the invention. For example, consider user 901 pointing a laser pointer 905 at an image generated by computer 910 on display 912, typically a large screen display (e.g., 5 feet diagonal or more) where control features here disclosed are of most value.

The user with the pointer, can point to an image or portion of the displayed image to be controlled, and then using the action of the pointer move the controlling portion of the image, for example a "virtual" slider control 930 projected on the screen whose lever 935 can be moved from left to right, to allow computer 910 sensing the image (for example by virtue of TV camera 940 looking at the screen as disclosed in copending applications) to make the appropriate change, for example in the heat in a room.

Alternatively one can also point at the object using ones fingers and using other aspects of the invention sense the motions of ones fingers with respect to the virtually displayed images on the screen, such as turning of a knob, moving of a slider, throwing a switch etc.

Such controls are not totally physical, as you don't feel the knob, so to speak. But they are not totally virtual either, as you turn it or other wise actuate the control just as if it was physical. For maximum effect, the computer should update the display as you make the move, so that you at least get visual feedback of the knob turning. You could also get an appropriate sound if desired, for example from speaker 950, like an increase in pitch of the sound as the knob is "moved" clockwise.

FIG. 10

The above control aspects can in some forms be used in a car as well even with a small display, or in some cases without the display.

Or it can be a real knob which is sensed, for example by determining position of a target on a steering wheel or the fingers turning it tracked (as disclosed in co-pending application references).

Figure 10A:
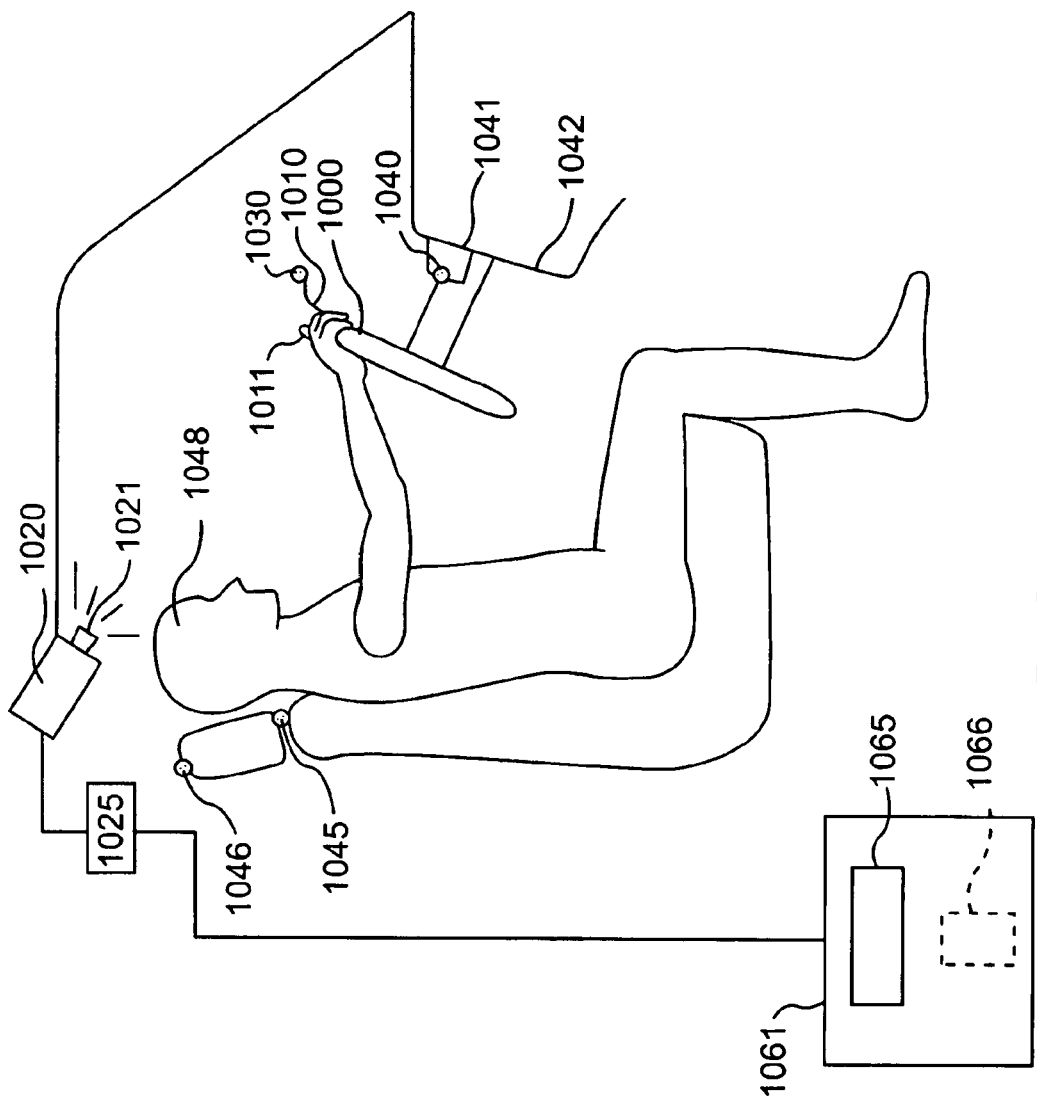
FIG. 10 illustrates control of automobile or other functions with the invention, using detected knob, switch or slider positions.

For example, consider car steering wheel rim 1000 in FIG. 10A. In particular, consider hinged targeted switch, 1010 (likely in a cluster of several switches) on or near the top of the wheel, when the car is pointed straight ahead, and actuated by the thumb of the driver 1011. A camera 1020 located in the headliner 1025, and read out by microcomputer 1025 senses representative target 1030 on switch 1010, when the switch is moved to an up position exposing the target to the camera (or one could cover the target with ones fingers, and when you take a finger off, it is exposed, or conversely one can cover the target to actuate the action).

The camera senses that target 1010 is desired to be signaled and accordingly computer 1025 assures this function, such as turning on the radio. As long as the switch stays in the position, the radio is on. However other forms of control can be used where the switch and target snap back to an original position, and the next actuation, turns the radio off. And too, the time the switch is actuated can indicate a function, such as increasing the volume of the radio until one lets off the switch, and the target is sensed to have swung back to its original position and the increase in volume thus terminated.

In operating the invention in this manner, one can see position, velocity, orientation, excursion, or any other attribute of actuation desired. Because of the very low cost involved in incremental additions of functions, all kinds of things not normally sensed can be economically provided. For example the position of a datum 1040 on manually or alternatively automatically movable plastic air outlet 1041 in the dashboard 1042 can be sensed, indicative of the direction of airflow. The computer 1025 can combine this with other data concerning driver or passenger wishes, other outlets, air temperature and the like, to perfect control of the ambiance of the car interior.

It is also noted that the same TV camera used to sense switch positions, wheel position, duct position, seat position (for example using datum 1045), head rest position (for example using datum 1046), and a variety of other aspects of physical positions or motions of both the car controls and the driver or passengers. And it can do this without wires or other complicating devices such as rotary encoders which otherwise add to the service complexity and cost.

When the camera is located as shown, it can also see other things of interest on the dashboard and indeed the human driver himself, for example his head 1048. This latter aspect has significance in that it can be used to determine numerous aspects such as:

1. The identity of the driver. For example, if a certain band of height isn't reached, such as point P on the drivers head, the ignition can be interlocked. Much simpler than face recognition, but effective if properly interlocked to prevent repeated retries in a short time period.

2. The position of the head of the driver in case of an accident. As detailed in reference 4, a camera or cameras can be used to determine head location, and indeed location of the upper torso if the field of view is large enough. This information can be used to control airbag deployment, or head rest position prior to or during an accident (noting too that headrest position can also be monitored without adding any hardware). Particularly of interest is that the pixel addressing camera of the invention can have the frequency response to be useful in a crash, sensing the movement of the person (particularly severe if unrestrained) within a millisecond or two, and providing a measure of the position for airbag deployment. Additional cameras may also be used to aid the determination, by providing other views or observing other features, for example.

Using a pixel addressing camera for camera 1020 confers additional advantages. For example consider the image of the car interior produced by the camera lens 1021, on matrix of pixels 1061, whose addressing and processing is controlled by computer 1025. In the first instance one can confine the window of view of a certain group of pixels of the total matrix 1061 to be only in the region of the steering wheel, as in window 1065 shown. This allows much faster readout of the more limited number of pixels, and thus of the steering wheel switches, at the expense of not seeing anywhere else in that particular reading. But this may be desirable in some cases, since it may only be required to scan for heater controls or seat positions, every 10 seconds say, while scanning for other more immediate items a hundred times per second or more. A good example are safety related functions. 5 per second might suffice for seeing where the turn signal or windshield washer control was, as an example. Window 1066 dotted lines is illustrative of a window specialized for head, headrest and seat positions, say.

Scans in certain areas of the image can also depend on information obtained. For example one may initiate a scan of a control position, based on the increasing or decreasing frequency of an event occurrence. For example if the persons head is in a different location for a significant number of scans made at 15 second intervals for example, then in case of a crash, this data could be considered unreliable. Thus the camera window corresponding to pixels in the zone of the head location 1048 could be scanned more frequently henceforward, either until the car stopped, or until such action settled down for example. Such action is often the case of a person listening to rock music, for example.

Similarly, if someone is detected operating the heater controls, a scan of predominately heater function controls and related zones like air outlets can be initiated. Thus while normal polling of heater controls might be every 2 seconds say, once action is detected, polling can increase in the window(s) in question to 40 times per second for example. The detection of action can be made first via the camera, or via input from some other input device such as a convention heater knob and electric circuit operable therewith.

Scans in certain areas of the image can also depend on information obtained in other areas of scan, or be initiated by other control actions or by voice. For example, if hard deacceleration was detected by an accelerometer, but before a crash occurred, the camera could immediately be commanded to begin scanning as fast as possible in the region of the image occupied by the driver and/or any humans in its field of view. This would be for the purpose of monitoring movements in a crash, if a crash came, in order to deploy an airbag for example.

One might utilize the invention to actuate a function, based on positions of people or other objects in the vehicle. As one example, suppose the drivers hand is resting on a console mounted gear lever. By scanning the image of this region, one can determine from the image the position of the console shift lever, and use the image thereof to control gear change via computer 1025. However if the driver rests his hands on the windshield wiper stalk, it could in the same manner, become a column mounted gear lever so to speak. Or just be used for up down gear changes, like a paddle shifter on a racing car. In fact in the latter sense, the camera could be instructed to detect ones finger or hand movement to do this function for example, wherever one desired to rest ones hand (within the camera field of view at least). This function is also useful for physically disabled persons wishing to drive the car. And it can be different for different persons as well, via programming of the control functions associated with any given hand, switch or other position or movement.

Figure 10B:
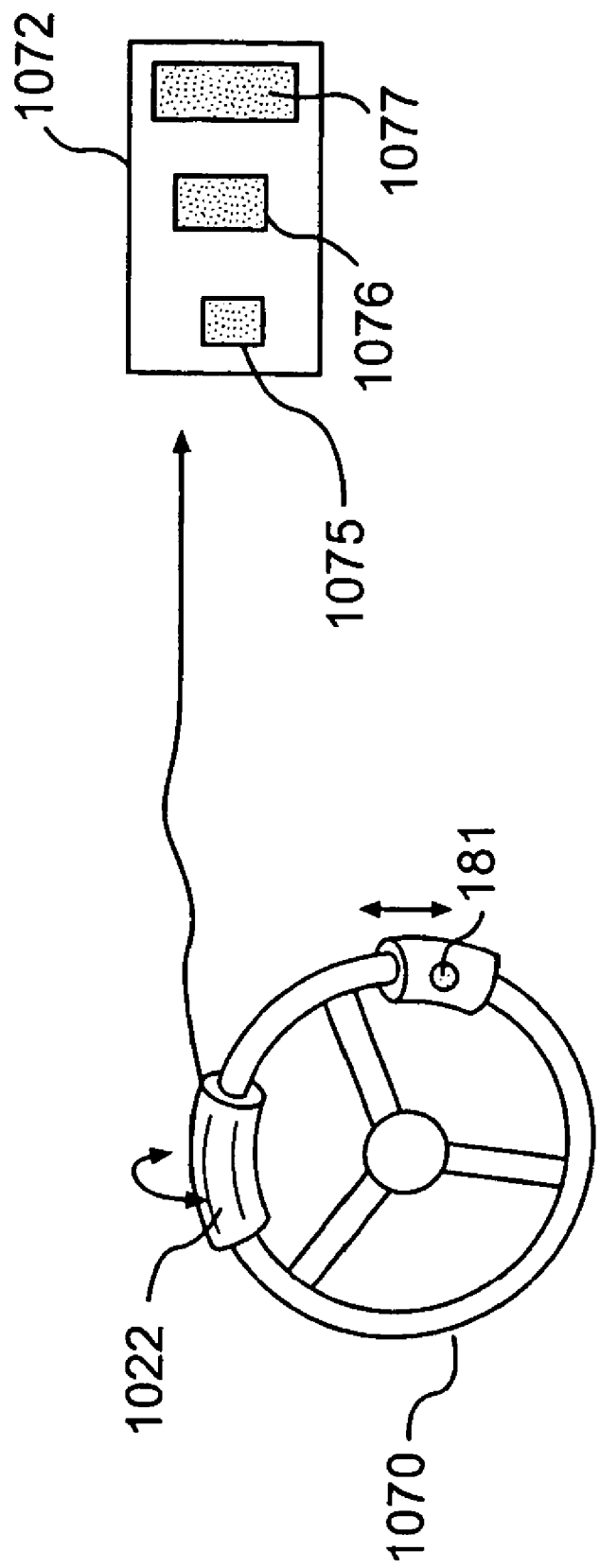

FIG. 10B illustrates alternative types of control mechanisms which can be used with the invention, in this case illustrated on the steering wheel of a car, although as can be appreciated, any suitable function or location may be used or created. And too, combinations of functions can be used. The invention is generic to car steering wheel controls, dishwashers, audio systems in ones home, heating and air conditioning elements and virtually all other forms of human related control functions. The key is that the camera computer combination makes a very inexpensive way to share a wide variety of functions with one or just a few basic systems and over a large population base.

As shown in FIG. 10B, the steering wheel 1070 has two additional types of controls visible to camera 1020 and able to be sensed and generate the appropriate control function via computer. These are rotating device 1072 built to rotate around the steering wheel rim circular cross section, and expose a continuously variable, or digital or step wise increment component to the camera. For example, three bars are shown, short 1075, medium 1076, and long 1077. The computer senses which of the three is visible by comparing the length to pre-stored values (or taught values, see below), and causes the desired action to occur.

The second control 1080 is a sliding device 1081 which can be slid clockwise, or counterclockwise along a circumferential section of the steering wheel at the top, sides or wherever. As before, Its position is determined by camera 1020 again providing more data than just a switch up or down as shown before.

While illustrated on the steering wheel where it is readily at hand, it can be appreciated that the position of either the slider 1081 or the rotary device 1072, or other similar devices for the purpose at hand could be elsewhere than the wheel, for example on stalk or on a piece of the dash, or other interior component indeed wherever a camera of the invention can view them without excessive obscuration by persons or things in the car. It need not be on a car either, controls of this type can be in the home or elsewhere. Indeed a viewable control datum can even be on a portable component such as ones key chain, phone, or article of clothing apparel, or whatever. Similarly the camera 1020 can view these items for other purposes as well.

The teach-ability of the invention is achieved by showing the camera the code marker in question (e.g., a short bar located on the wheel), and in the computer recording this data along with what it is supposed to signify as a control function for example, turn rear wiper on to first setting. This added functionality of being easily changed after manufacture is an important advantage in some cases, as for example, today after-market addition of wired in accessories is difficult.

Games Using the Invention

The co-pending referenced applications have described games which can be played with target sensing and touch screen based devices, typically but not necessarily, electro-optically based (e.g., TV camera). The cameras of the invention can be used to, for example: Sense the player or players in the game or portions thereof; sense objects held or manipulated by the players (e.g., a ball, a pistol); sense physical tokens used in the game, such as monopoly game tokens; and sense game accessories such as checkerboards, croquet wickets; compare positions of objects with respect to other objects or players.

In addition, the cameras can be used to take images which can be displayed also a major feature given the ability to create life size displays. And the computer of the invention can be used to control the presentation of background image data from stored images, or even images downloaded from the internet for example.

Some or all of these aspects will now be illustrated in some representative game illustrations (again noting that some more are in the co-pending applications).

FIG. 11 Board Game

Even today, popular board games such as Monopoly and the like are being provided in computer playable form, with the "board" represented on the screen of the computer monitor. The invention here builds on this by providing various added features which allow a physical nature of the game just as the real game, but with new aspects and providing physical game play which can be transmitted over the internet to others. These features also can be turned off or on at as desired.

Figure 11A:
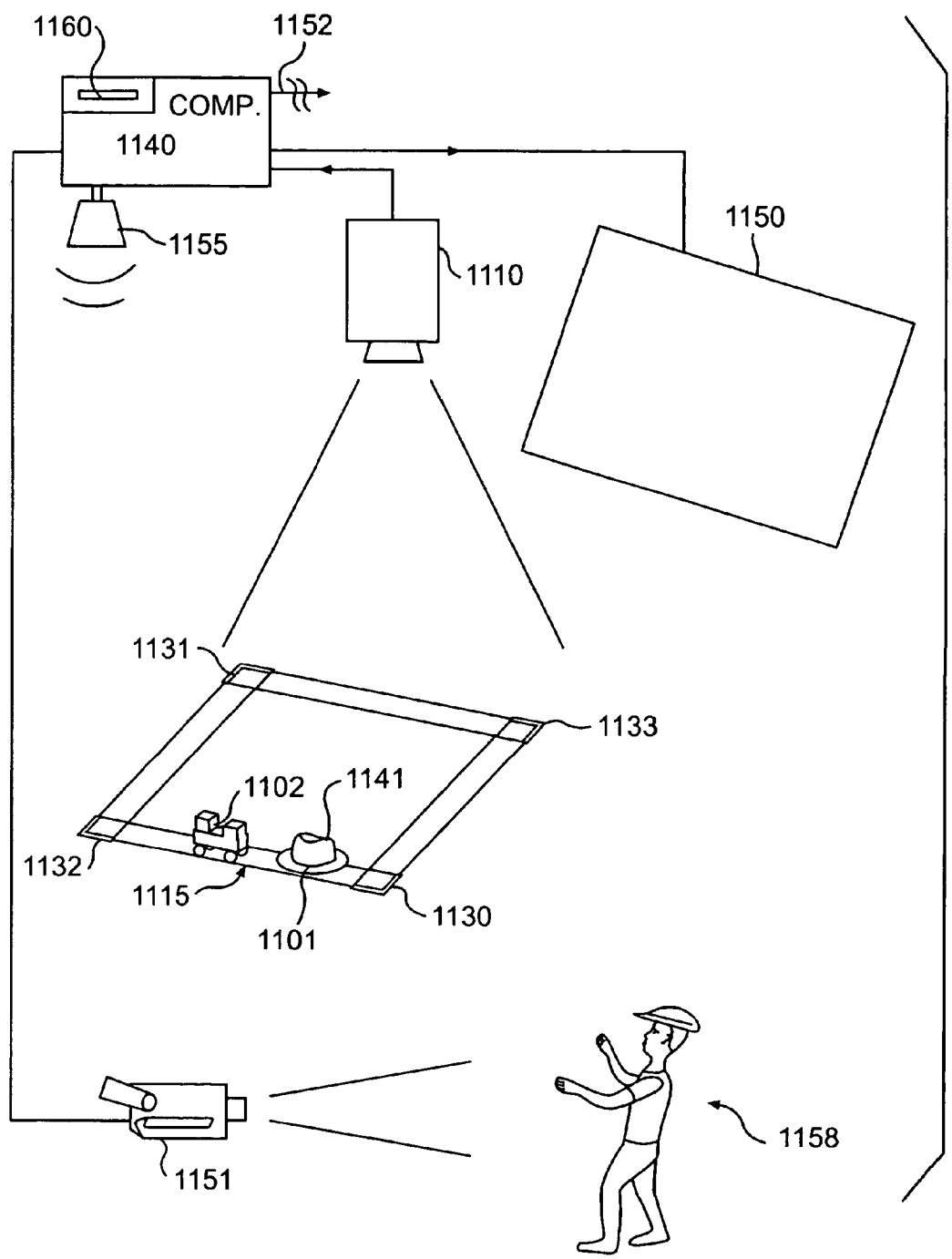
FIG. 11 illustrates a board game embodiment of the invention.

In one version shown in FIG. 11A, the player tokens such as 1101 and 1102 are observed by camera of the invention 1110 placed directly overhead of the play board 1115, which can for example be a traditional monopoly board (chess board, checker board, etc). points on the board such as corners 1130, 1131, 1132, and 1133 can also be observed to establish a reference coordinate system for the computer 1140 to track the moves of the markers, either from their natural features, or from specialized datums thereon (e.g., retro-reflective hat top 1141 on marker 1101). For example a train shape 1102 of a marker can be called from memory, or taught to the computer by showing it to the camera. Rotation invariant image analysis programs such as the PATMAX program from Cognex company can be used to identify the marker in any normal orientation, together with its location on the board (the board itself can be taught to the computer using the camera, but is preferably called up from memory).

The board position and relative scale in the field of view is determined easily by knowing the spacing of the corner points 1130-1133 and using this to calibrate the camera (to provide extra contrast, the corners can have retro-reflective glass bead edging or beading as shown). For example if the points are spaced 20 inch on corners of the board, and the camera is positioned so that 20 inches occupies 80% of its field of view, then the field of view is 25 inches square (for a square matrix of camera pixels), and each pixel of 1000 pixels square, occupies 0.025 inches in the object field.

The play of both players (and others as desired) can be displayed on the monitor 1150, along with an image of the board (which also can be called from computer memory). But other displays can be provided as well. For example to lend more realism to the game, the display (and if desired sound from speaker 1155 connected to computer 1140) can also be programmed to show an image or sound that corresponds to the game. For example, when the camera image has provided information that one player has landed on "Boardwalk" (the most valuable property) a big building could be caused to be shown on the screen, corresponding to it also suitable sounds like wow or something provided).

The camera can be used to see monopoly money (or other game accessories) as well, and to provide input so the computer can count it or do whatever.

A large, wall sized for example, screen can add added realism, by allowing one to actually get the feeling of being inside the property purchased, for example.

Figure 11B:
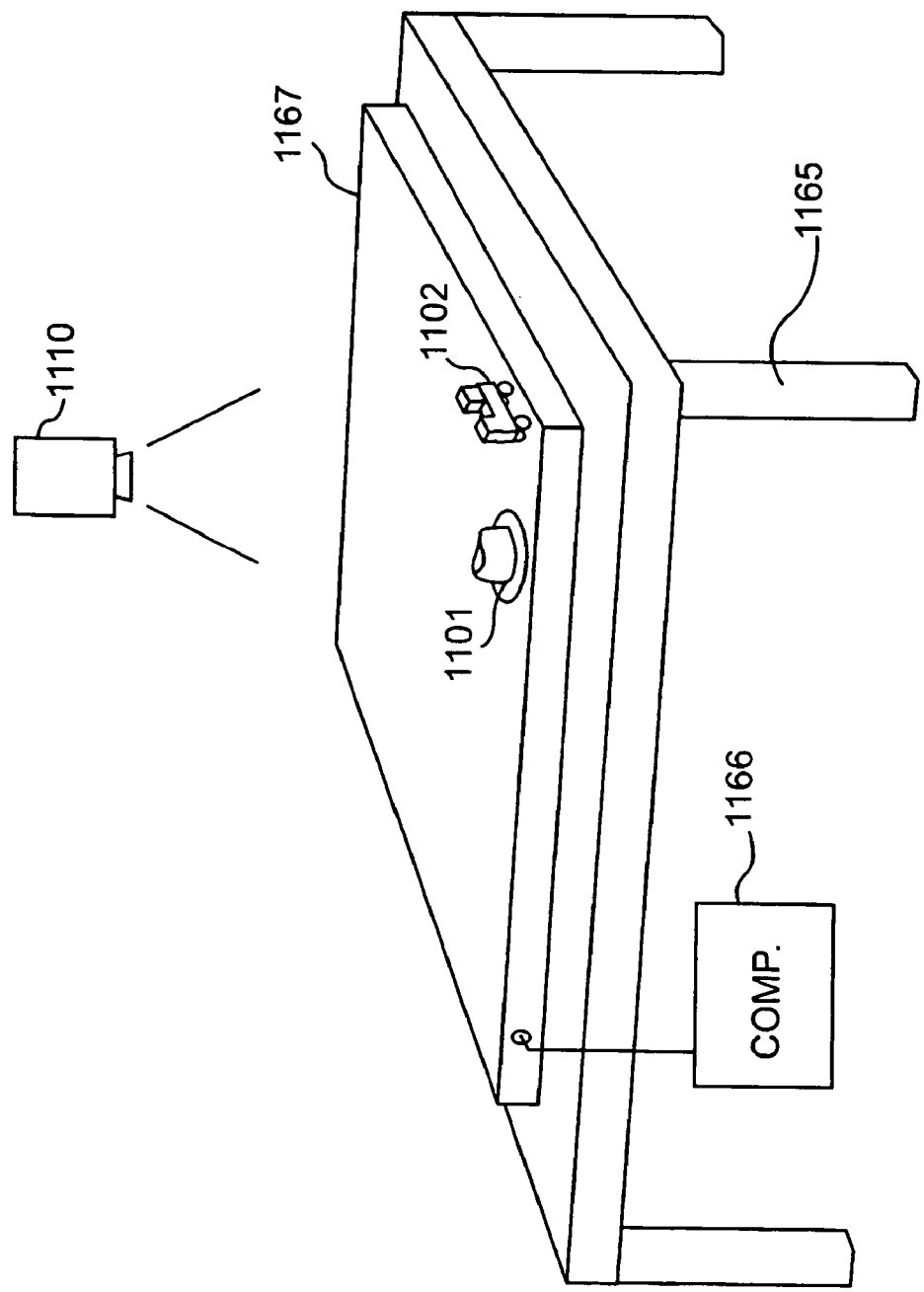

One of the exciting aspects of this game is that it can be used to turn an existing board game into something different. For example, in the original monopoly the streets are named after those in Atlantic City. By using the computer, and say a DVD disc such as 1160 stored images of any city desired can be displayed, together with sounds. For example, one could land on the Gritti Palace Hotel in Venice, instead of Boardwalk. As shown in FIG. 11B, the TV camera senses the image of train marker 1101, and conveys this information to computer 1140, which causes the display 1150 and speaker of the invention to display the information desired by the program in use.

Making the game in software in this way, allows one to bring it home to any city desired. This is true of a pure (virtual) computer game as well, where the board only exists on the computer screen.

For added fun, for example in a small town context, local stores and properties could be used, together with local images, local personages appearing on the screen hawking them, and the like. A local bank could be displayed to take your money, (even with sounds of the local banker, or their jingle from the radio) etc. This makes the game much more local and interesting for many people. Given the ease of creating such local imagery and sounds with cameras such as digital camcorder 1151 used as an input of display imagery (e.g., from local celebrity 1158) to the game program, one can make any monopoly experience more interesting and fun at low cost.

The same holds true with other well known games, such as Clue, where local homes could be the mystery solving location, for example. One can also create games to order, by laying out ones own board. If one of the persons is remote, their move can be displayed on the screen 1150.

In the above, the display has been treated as sort of backdrop or illustration related. However, one can also create a whole new class of games in which the display and/or computer and the board are intertwined. For example as one takes a trip around the monopoly board, several chance related drawings opportunities occur during play. In this new game, such could be internet addresses one draws, which, via modem 1152, send the board game computer 1140 to any of a large number of potential internet sites where new experiences await, and are displayed in sight and sound on the display.

It should also be noted that the board can be displayed on the screen as well, or alternatively projected on a wall or table (from overhead). A particularly neat mixture of new and old is shown in FIG. 11B, where the board is displayed on a screen pointed vertically upward just as it would be on a table, and indeed in this case physically resident on a table 1165. The board is displayed (from software images or cad models of the board in computer 1166) on a high resolution table top HDTV LCD screen 1167 with a suitable protective plastic shield (not shown for clarity). Play can proceed just as before using physical tokens such as 1101 and 1102. In this case the display used to augment the game can actually be shown on the same screen as the board, if desired.

The TV camera 1110 in this context is used to see the tokens and any other objects of the game, the people as desired, and the play, as desired. The camera can be used to see the display screen, but the data concerning the board configuration displayed may be best imputed to the computer program from direct data used to create the display.

A beauty of the invention is that it allows the interaction of both computer generated images and simulations, with the play using normal objects, such as one might be accustomed to for example, or which give a "real" feel, or experience to the game.

Figure 12:
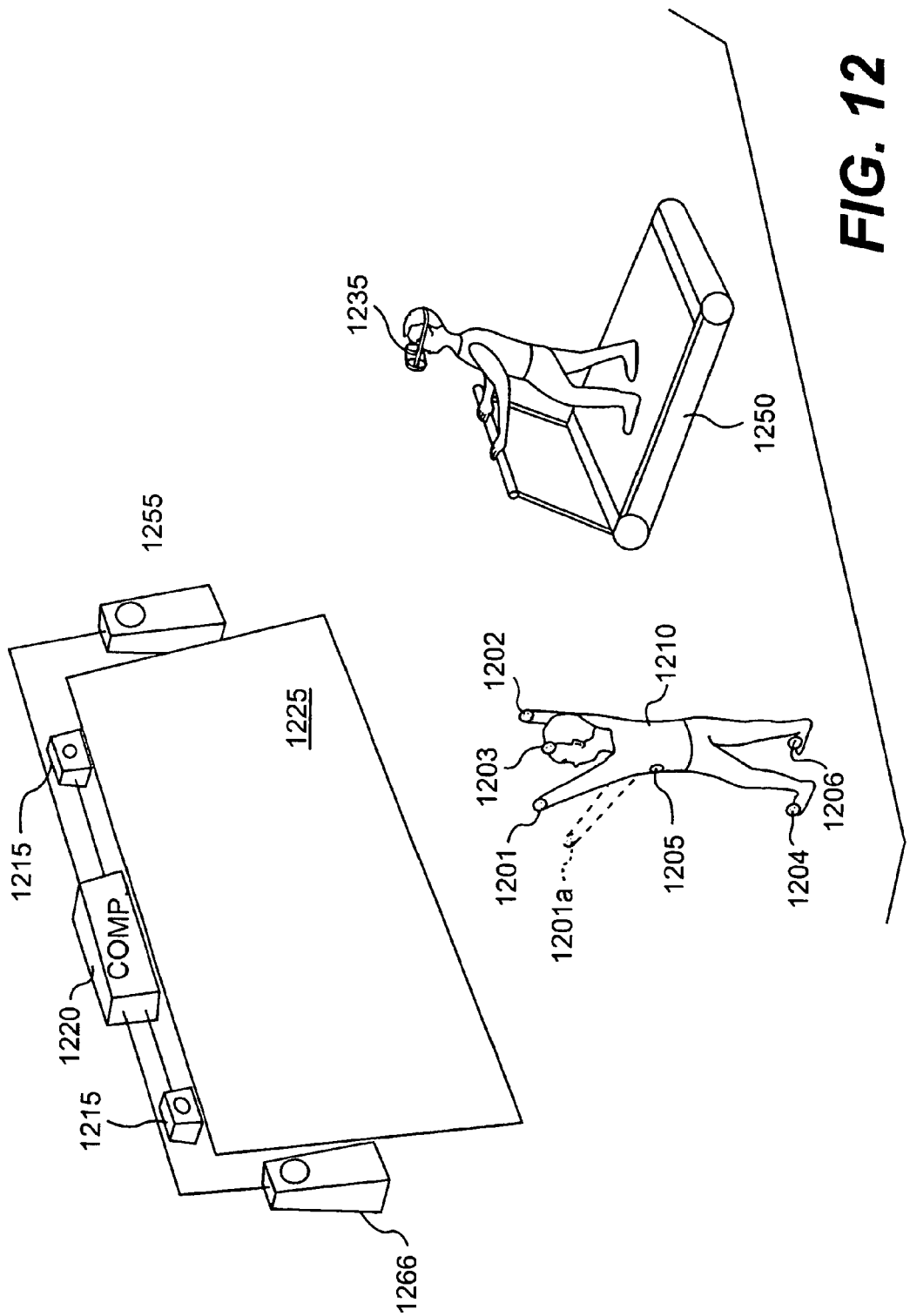
FIG. 12 illustrates a generic game embodiment of the invention.

FIG. 12 Sports Game

FIG. 12 illustrates a generic physical game of the invention using points such as 1201-1205 on the human (or humans) 1210 sensed by a TV camera such as stereo camera pair 1215 and transmitted to the computer of the invention 1220. While points can be sensed in 2D, this illustration uses as stereo camera pair located on large screen display 1225 as shown to provide a unitary package built into the screen display (pointed out in other co-pending applications). In this particular instance a 3D display is illustrated, though this isn't necessary to obtain value and a good gaming experience. The human optionally wears red and green filter glasses 1235 such that red images on the screen are transmitted to one eye, green to another, so as to provide a 3D effect. Similarly crossed polarized filter glasses (with appropriate display), and any other sort of stereoscopic, or autosteroscopic method can also be used, but the one illustrated is simple, requires no connecting wires to the human, and can be viewed by multiple uses, say in a gym aerobics room.

The game is generic, in that it totally depends on the program of the computer. For example, it can be an exercise game, in which one walks on a treadmill 1250, but the image displayed on screen 1225 and sound from speakers 1255 and 1266 carry one through a Bavarian forest or the streets of New York as one walks, for example.

Or it can be a parasail game in which one flies over the water near Wakiki beach, with suitable images and sounds. In any case action determined by sensing position, velocity acceleration, or orientation of points 1201-1206 on the player, 1210 is converted by computer 1220 into commands for the display and sound system. Note in the figure this player is shown viewing the same screen as the treadmill walker. This has been shown for illustration purposes, and it is unlikely the same game could be applied to both, but it is possible.

It is noted that fast sensing, such as provided by the pixel addressing camera method disclosed above is highly desirable to allow realistic responses to be generated. This is especially true where velocities or accelerations need to be calculated from the point position data present in the image (and in comparison to previous images).

For example, consider points 1201 and 1202 on player 1210. If point 1201 moves to 1201a, and 1202 moves to 1202a indicative of a quick jerk movement to turn the displayed parasail, this movement could occur in a 0.1 second. But the individual point movements to trace the action would have to be sensed in 0.01 second or quicker for example to even approximately determine the acceleration and thus force exerted on the glider, to cause it to move.

It is important to note that the invention is not only generic in so far as the variety of these games are concerned, but it also achieves the above with virtually no mechanical devices requiring maintenance and creating reliability problems which can eliminate profits from arcade type businesses especially with ever more sophistication required of the games themselves.

FIG. 13 Bar Game

Figure 15:
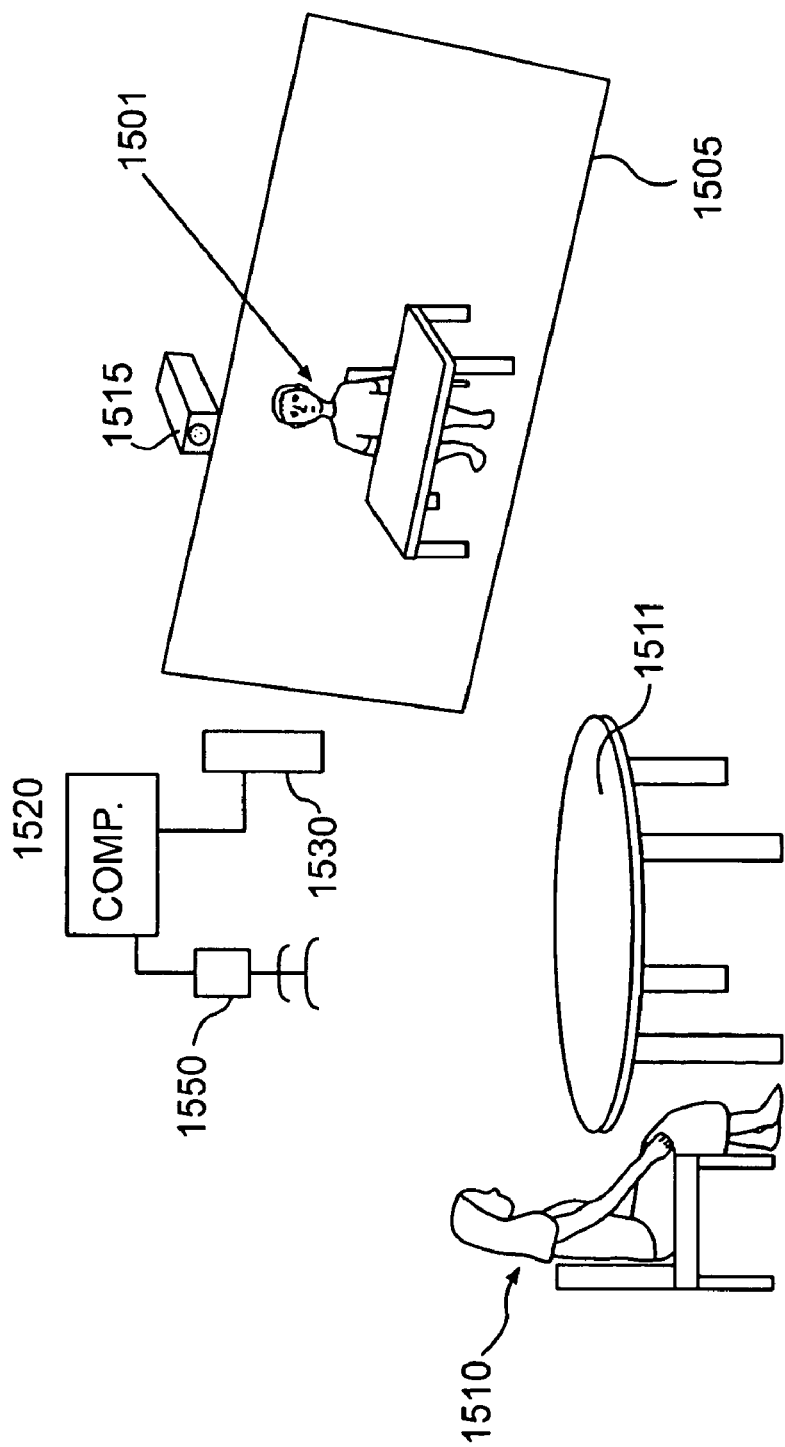
FIG. 15 illustrates a gesture based flirting game embodiment of the invention.

FIG. 13 illustrates a game which is in a class of gesture based games, in which the flirting game of FIG. 15 is also an example. In such games one senses the position, velocity or acceleration of a part of a person, or an object associated with the person. This can also include a sequence of positions, itself constituting the gesture. The detected data is then related to some goal of the contest. Consider FIG. 13, wherein the object in ones hand is monitored using the invention, and a score or other result is determined based on the position, velocity, orientation or other variable of the object determined. For example, in a bar one can monitor the position, orientation, and rate of change thereof of drinking glasses.

A two person game is illustrated, but any reasonable number can play as long as the targets can all be tracked sufficiently for the game (in one test over 200 targets were acquired, but as can be appreciated this uses most of the field of view of the camera, and thus speed improvements made possible by pixel addressing become more difficult.

As shown, a single camera 1301 observes one or more targets such as 1305 on glass 1310 held by contestant 1315, and target 1320 on glass 1325 of contestant 1330. On a signal, each drinks, and a score is calculated by program resident in computer 1350 based on the time taken to raise the glass, and place it back empty on table 1355. A display of the score, and an image desired, for example of the winner (taken with camera 1301 or another camera), or a funny image called from computer memory, is displayed on monitor display 1370.

If the glass features are sufficiently distinct for reliable and rapid acquisition and tracking, for example as might be provided by an orange color, or a distinct shape, then specialized target features are not required.

Alternatively the velocity, path of movement of the glass (or other object), acceleration, or any other variable from which target data is sufficient to calculate, can be used to determine a score or other information to be presented or used.

FIG. 14

The referenced co-pending applications have described a game where by laser pointers can be used to designate images on a TV screen. In this case of FIG. 14A, the TV camera of the invention such as 1410 is used in a two player game to see laser pointer spots such as 1420 and 1421 projected by players 1430 and 1431 respectively, using laser pointers 1440 and 1441 respectively. When one player's spot hits the other, the event is recorded in memory of computer 1450 for further analysis and display.

In a somewhat different context, a person can use a laser pointer to point at an object to designate it for some purpose, for example for action. For example consider FIG. 14B, in which housewife 1460 who points with laser pointer 1462 so as to provide a laser spot 1465 on dishwasher 1470. TV camera of the invention 1475 in corner of the kitchen 1480 picks up all laser spots in an image of the room (made easier to process in terms of signal to background imagery if one locates a laser wavelength band-pass interference filter 1481 in front of the TV camera as shown) and compares via computer 1483, the location of the spot detected in the image to stored memory locations of objects such as the dishwasher 1470 or fridge 1485 in the camera field of view, so as to identify the object needing action. In this case too, housewife may signal via a spatially variant laser pointer projection image (see copending referenced applications for further examples in other applications), or a series of spots in time, what action is desired, for example to turn the washer on. In this case the computer 1483 can cause a command to do so to be sent to the washer.

Any one with a simple laser pointer can make these commands effective. No learning is needed just point at the item desired, with the TV camera and computer of the invention acquiring the data and interpreting it. This is much simpler than remote controls of today, and a major advantage for those who have difficulty or inclination to learn complex electronic devices and procedures. It should be noted that these pointing procedures can easily be combined with voice recognition to further define the desired control activity for example inputting the housewife's voice in this example by virtue of microphone 1476.

The stored locations can be taught. For example in a setup mode, one can point a laser pointer at the dishwasher, and indicate to the computer that that spot is the dishwasher. The indication can be provided by keyboard, voice recognition or any other means that is satisfactory.

Clearly other items can be monitored or controlled in this manner. The camera can also detect optical indications provided by other means, for example lights in the appliance itself. And one can detect whether light have been left on at night (or not left on) and cause them to be turned off or on as desired.

Such a camera if it is responsive to normal illumination as well as that of the laser wavelength, can also be used to see movements and locations of people. For example, it can look at the top of the stove, and assure that no movement is near the stove 1486, or objects on it if programmed to do so, thus sounding an alarm if an infant should get near the stove, for example.

The housewife in the kitchen can also point at a board on which preprogrammed actions are represented. For example consider board 1490, shown in greater detail in FIG. 14C, in which 3 squares 1491-1493 are to represent different functions. Thus if 1491 is programmed (via keyboard, voice or whatever) to represent turning on the clothes dryer in the laundry, when the TV camera sees, and via the computer, identifies spot 1496 projected by the user on square 1491, it causes the dryer to turn on. Operated in this manner, the board 1490, in combination with a TV camera of the invention (such as 1475 or a more dedicated one for the board alone) and computer such as 1483 can be considered a form of touch screen, where the user, in this case in the kitchen can point at a portion of the board with a finger, or a laser pointer, and register a choice, much like touching an icon on a conventional computer touch screen.

Similarly, squares or other zones representing choices or the like can be on the item itself. For example, a stove can have four areas on its front, which can be pointed at individually for control purposes, what ever they are (e.g., representing heat settings, burner locations or the like). For security, it could be that only a coded sequence of laser pulses would be seen, or as pointed out in co-pending reference Ser. No. 60/133,673, a spatial code, for example representing the user such as an initial could be projected, and sensed on the object by the TV camera.

The laser pointer can be held in the hand of the user, or, like 1497 attached for example to a finger, such as forefinger 1498. Or it can be on or in another object, desirably one which is often hand held in the normal course of work, such as a TV remote control, a large spoon, or the like. Or using other aspects of the invention, the finger of the user can be observed to point directly, and the object being pointed at determined. For example if finger 1498 is moved 4 times, it could indicate to the TV camera and thence computer that channel four was desired on a TV display not shown.

If a special pointer is used, it can be any workable optical device, not necessarily a laser. The camera and computer of the invention can also be used to observe the user pointing directly, and compute the pointing vector, as has been described in my co-pending applications.

FIG. 15 A "Flirting" Game

Another game type is where the camera looks at the human, and the humans expressions are used in the game. In this case it is facial expressions, hand or body gestures that are the thing most used.

For example, one idea is to have a scene in a restaurant displayed on a display screen 1500, preferably a large HDTV screen or wall projection to be as lifelike as possible, and preferably life size as well which lends extra realism to some games, such as this one due to the human element involved.

Let us consider that seated at the table in the restaurant displayed on the screen is a handsome man 1501 whose picture (likely a 3D rendered animation, or alternatively photo-imagery called from memory), and the goal for the girl 1510 playing the game is to flirt with this man until he gets up and comes over to say hello, ask her out or what ever (what he does, could be a function of the score obtained, even!).

Player 1510 seated at table 1511 (for authenticity, for example) is observed by TV camera 1515 (or stereo pair as desired, depending whether 3D information is thought required) and computer of the invention 1520, which through software determines the position of eyebrows, lips, hands, fingers and any other features needed for the game. If necessary, specialized targets can be used as disclosed herein and elsewhere to augment this discrimination, for example such as optically contrasting nail polish, lipstick, eyeliner or other. Contrast can be in a color sense, or in a reflectivity sense such as even retro-reflective materials such as Scotchlite 7615 by 3M company. Even special targets can be used to enhance expressions if desired.

This can be a fun type game, as the response of the displayed person can be all kinds of things even contrary to the actual gestures if desired. Sounds, such as from speaker 1530 can also be added. And voice recognition of players words sensed by microphone 1550 can also be used, if verbal as well as expressive flirting is used.

While the game here has been illustrated in a popular flirting context, it is more generally described as a gesture based game. It can also be done with another contestant acting as the other player. And For example, the contestants can be spaced by the communication medium of the internet. The displayed characters on the screen (of the other player) can be real, or representations whose expressions and movements change due to sensed data from the player, transmitted in vector or other form to minimize communication bandwidth if desired.

Other games of interest might be:

"Down on the Farm" in which a farmer with live animals is displayed on a life size screen, and the children playing the game are to help the farmer by calling the animals to come over to them. This would use recognition of voice and gesture to make the animal images move and make sounds.

A player can find someone in a display and point at him, like the "Whereas Waldo" puzzle game. Then the subject moves, child runs to peek at him, and to find him, say running down a street whose image is displayed on the screen.

One can also use the camera of the invention to monitor the progress made by a child building blocks, and show an Video displayed image of a real skyscraper progressing as he builds his little version. Note the benefit of group activity like a board game and children's play with each other.

FIG. 16

Figure 16:
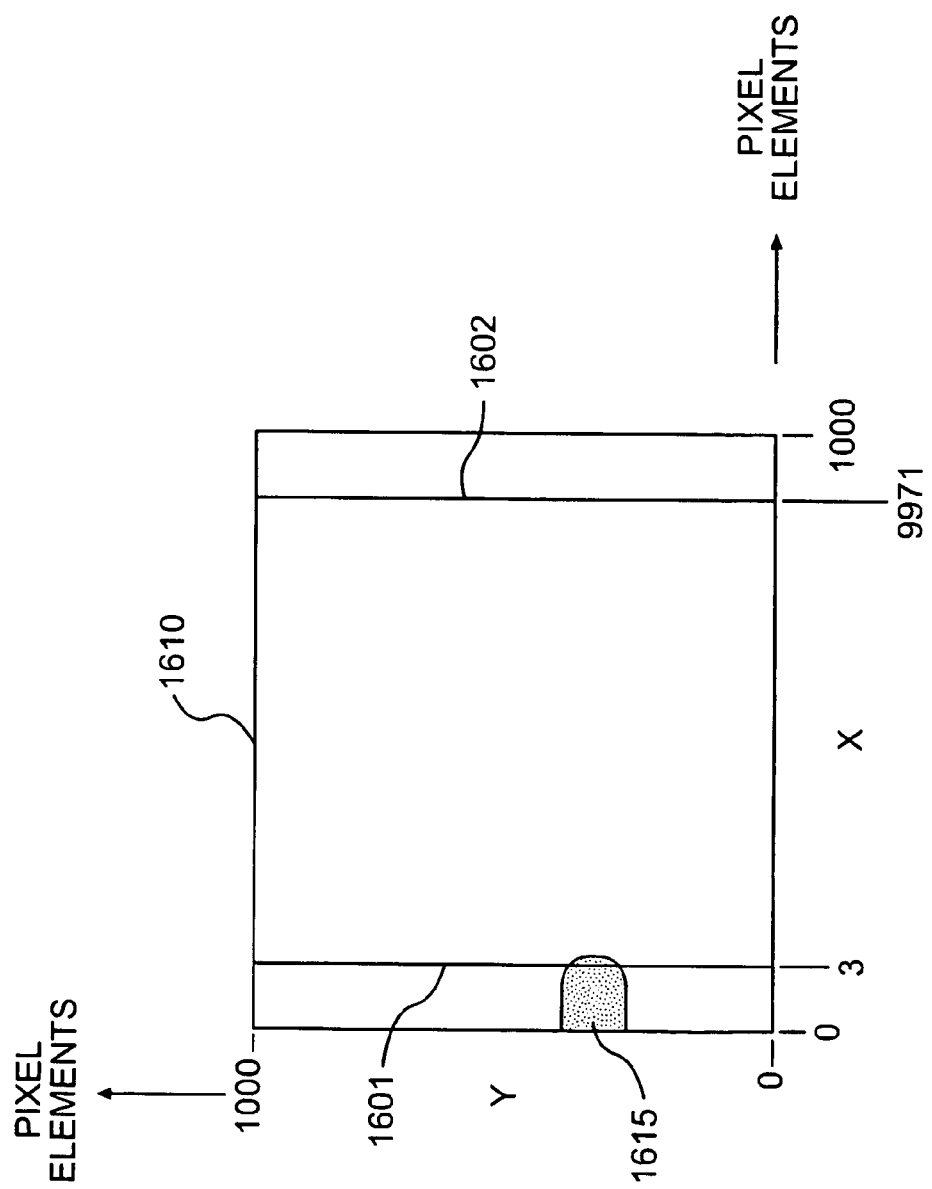
FIG. 16 illustrates a version of the pixel addressing camera technique wherein two lines on either side of a 1000 element square array are designated as perimeter fence lines to initiate tracking or other action.

FIG. 16 illustrates a version of the pixel addressing camera technique wherein two lines on either side of a 1000 element square array are designated as perimeter fence lines to initiate tracking or other action.

Some "pixel addressing" cameras such as the IVP MAPP 2500 512×512 element camera, are smart, that is can process on the same chip. However, in some cases the control of such a camera may not allow one to actually read just one pixel, say, but rather one must read the whole line on which the pixel rests. Now some processing can be in parallel such that no speed is lost, at least in many instances.

If however, one does have to read a whole line serially into a computer portion, then to fully see a 10×10 pixel round target say, one would have to read at least 10 lines.

If two targets both were located on the same lines, the time involved to read would be the same.

In the same vein, if lines of data must be scanned, then the approach of $2b$ wherein every $20^{th}$ pixel say is interrogated can be specialized to having such pixels fall on scan lines wherever possible. And where one is restricted to reading all pixels on a scan line and where a target entry zone is anticipated, one can have a scan line oriented to be crossed by such entry. For example in FIG. 16, the two lines 1601 (line of pixels 3) and 1602 (line of pixels 997) of a 1000×1000 element pixel array 1610 are designated as perimeter fence lines, to trigger a target tracking or other function on the entry of a target image on to the array, such as 1615 from either the right or left side in the drawing. This is often the case where entry from top or bottom is precluded by constraints of the application, such as a table top at the bottom, or the height of a person at the top. Or in a stereo example such as FIG. 6, the baseline defines the direction of excursion of a target as z is varied again calling for crossing of scan lines out of the plane of the paper at some point.

The invention herein has provided an exciting method by which common board games can become more fun. The invention provides a link with that past, as well as all of the benefits of the video and computer revolution, also via the internet.

It is envisioned that the same approach may be applied to many card games as well. It is also thought that the invention will find use in creating ones own games, or in downloading from the internet others creations. For example, common everyday objects can become the tokens of the games, and taught to the game computer by presenting them to the video camera. Similarly, the people playing the game can be taught, including their names and interests.

FIG. 17

FIG. 17 illustrates a 3D acoustic imaging embodiment of the invention which at low cost may generate accurate 3D images of the insides of objects, when used in conjunction with ultrasonic transducers and particularly a matrix array of ultrasonic transducers.

Figure 17C:
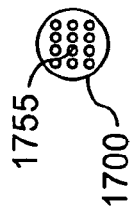
FIG. 17 illustrates a 3-D acoustic imaging embodiment of the invention.
Figure 17A:
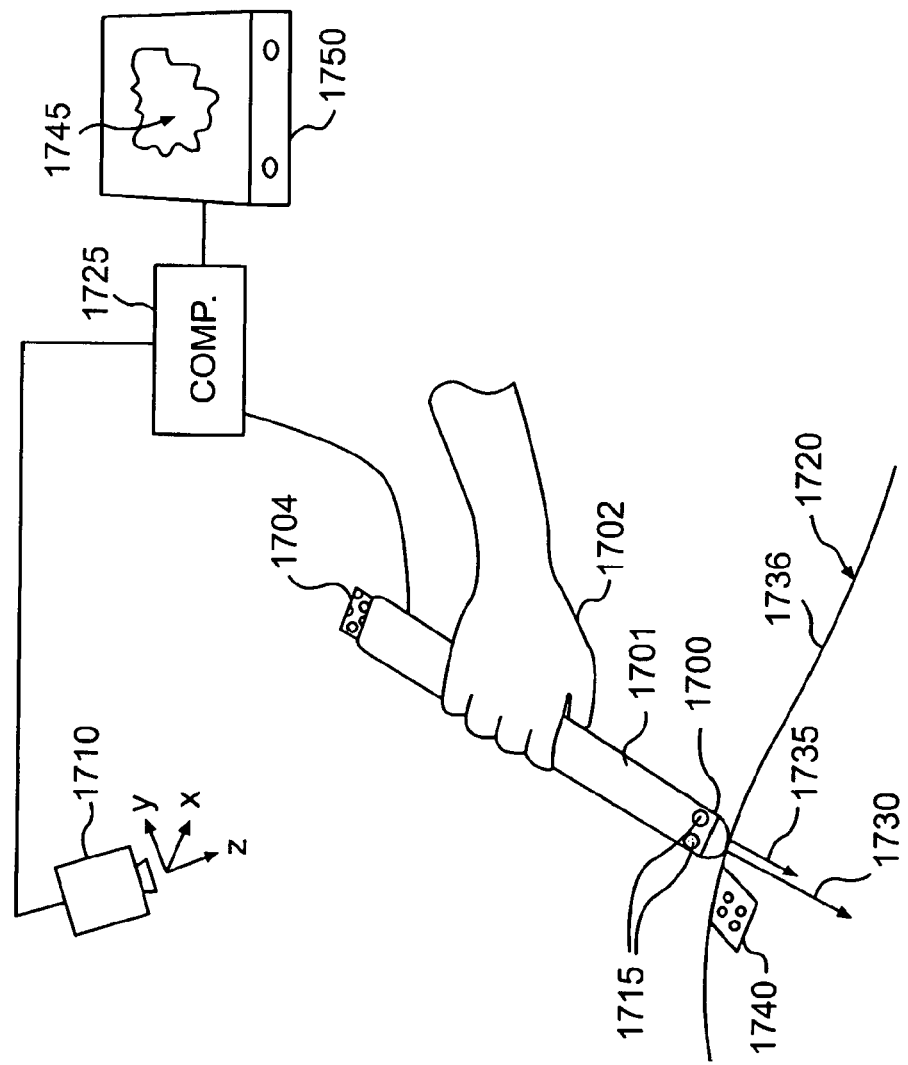

As shown in FIG. 17A, the position in xyz of the ultrasonic imaging head 1700 on wand 1701 held in a users hand 1702 is monitored electro-optically as taught in FIG. 1, using a single camera 1710 and a simple four dot target set 1715 on the head 1700 at the end of the transducer wand 1701 in contact with the object to be examined 1720. Alternatively, as also taught in FIG. 1, a stereo pair for example providing higher resolution in angle can be employed.

Computer 1725 combines ultrasonic ranging data from the ultrasound transducer head 1700 and from the sensor of transducer location (in this case performed optically by camera 1710 using the optically visible targets on the transducer head) in order to create a range image of the internal body of the object 1720 which is thus referenced accurately in space to the external coordinate system in the is case represented by the camera co-ordinates xy in the plane of the TV camera scan, and z in the optical axis of the camera.

In many cases it is also desirable to know the pointing angles of the transducer. One instance is where it is not possible to see the transducer itself due to obscuration, in which case the target may alternately be located at the end 1704 of the wand for example. Here the position and orientation of the wand is determined from the target data, and the known length of the wand to the tip is used, with the determined pointing angle in pitch and yaw (obtained from the foreshortening of the target spacings in the camera image field) to calculate the tip position in space.

This pitch and yaw determination also has another use however, and that is to determine any adjustments that need to be made in the ultrasonic transduction parameters or to the data obtained, realizing that the direction of ultrasound propagation from the transducer is also in the pointing direction. And that the variation in ultrasound response may be very dependent on the relation of this direction 1730 with respect to the normal 1735 of the surface 1736 of the object (the normal vector is shown for clarity pointing inward to the object).

The difference in direction can be calculated by using the TV camera (which could be a stereo pair for greater angular resolution) as well to determine the surface normal direction. This can, for example, be done by placing a target set such as 1740 on the surface in the field of the camera as shown. This can be dynamically or statically accomplished using the photogrammetric method described in the Pinkney references.

Differences in direction between the surface normal and the transducer pointing direction are then utilized by software in the computer 1725 of the invention in analysis of the ultrasound signals detected. The pointing angle and the position of the transducer on the surface of the object are used by the computer in predicting the location of various returns from internal points within the object, using a suitable coordinate transformation to relate them to the external coordinate reference of the TV camera.

All data, including transducer signals and wand location is fed to computer 1725 which then allows the 3D image of the inside of the body to be determined as the wand is moved around, by a human, or by a robot. This is really neat as all the images sequentially obtained in this manner can be combined in the computer to give an accurate 3D picture 1745 displayed on monitor 1750.

In one preferred embodiment as shown in FIG. 17C, the transducer head 1700 is comprised of a matrix 1755 of 72 individual transducer elements which send and receive ultrasound data at for example, 5 MHZ. This allows an expanded scan capability, since the sensor can be held steady at each discrete location xyz on the object surface, and a 3D image obtained with out movement of the transducer head, by analyzing the outputs of each of the transducers. Some earlier examples are described in articles such as: Richard E. Davidsen, 1996 IEEE Ultrasonics Symposium, A Multiplexed Two-Dimensional Array For Real Time Volumetric and B-Mode; Stephen W. Smith, 1995 IEEE Ultrasonics Symposium, Update On 2-D Array Transducers For Medical Ultrasound, 1995.

If the wand is now moved in space, fine scan resolution is obtained, due to the operation of the individual elements so positioned with out the need to move the wand in a fine pitch manner to all points needed for spatial resolution of this order. This eases the operators task, if manually performed, and makes robotization of such examination much easier from a control point of view.

Figure 17B:
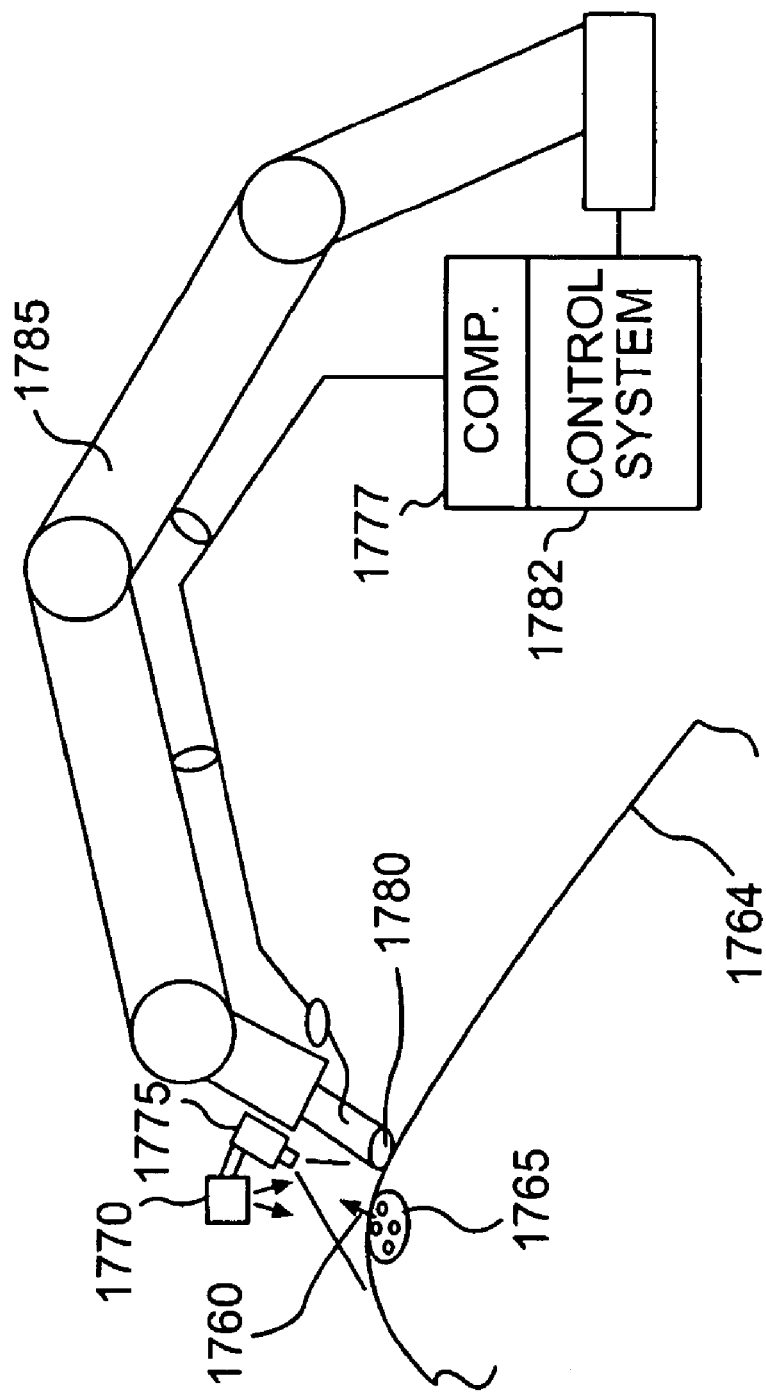

Consider FIG. 17B which illustrates a transducer as just described, also with automatic compensation at each point for pointing angle, robotically positioned by robot, 1785 with respect to object 1764. In this case a projection technique such as described in U.S. Pat. No. 5,854,491 is used to optically determine the attitude of the object surface, and the surface normal direction 1760 from the position of target set 1765 projected on the surface by diode laser set 1770, and observed by TV Camera 1775 located typically near the working end of the robot. Differences between the normal direction and the transducer propagation direction (typically parallel to the housing of the transducer) is then used by computer 1777 to correct the data of the ultrasonic sensor 1780 whose pointing direction in space is known through the joint angle encoders and associated control system 1782 of robot 1785 holding the sensor. Alternatively the pointing direction of this sensor can be monitored by an external camera such as 1710 of FIG. 17A.

It should be noted that the data obtained by TV camera 1775 concerning the normal to the surface and the surface range from the robot/ultrasonic sensor, can be used advantageously by the control system 1782 to position the robot and sensor with respect to the surface, in order to provide a fully automatic inspection of object 1764. Indeed the camera sensor operating in triangulation can be used to establish the coordinates of the exterior surface of object 1764 as taught for example in U.S. Pat. No. 5,854,491, while at the same time, the acoustic sensor can determine the range to interior points which can be differentiated by their return signal time or other means. In this manner, a complete 3D map of the total object, interior and exterior, can be obtained relative to the coordinate system of the Robot, which can then be transformed to any coordinate system desired.

The invention has a myriad of applications beyond those specifically described herein. The games possible with the invention in particular are limited only by the imagination.

What is claimed is:

1. A method for controlling a handheld computing device comprising the steps of:
   holding said device in one hand;
   moving at least one finger in space in order to signal a command to said device;
   electro-optically sensing light reflected from said at least one finger using a sensing means associated with said device;
   determining from said sensed light the movement of said finger, and
   using said sensed finger movement information, controlling said device in accordance with said command.

2. A method according to claim 1, wherein at least one camera is utilized to effect said electro-optical sensing.

3. A method according to claim 1, including the further step of acquiring an image of at least a portion of the user of the device.

4. A method according to claim 1, wherein said movement is sensed in 3 dimensions.

5. A method according to claim 1, wherein movement of one finger relative to another finger is sensed.

6. A method according to claim 1, wherein movement of two fingers is sensed.

7. Handheld computer apparatus comprising:
   a housing;
   a camera means associated with said housing for obtaining an image using reflected light of at least one object positioned by a user operating said object;
   computer means within said housing for analyzing said image to determine information concerning a position or movement of said object; and
   means for controlling a function of said apparatus using said information.

8. Apparatus according to claim 7, wherein said object is a finger.

9. Apparatus according to claim 7, further including a display function which is controlled.

10. Apparatus according to claim 9, wherein said display is 3D display.

11. Apparatus according to claim 7, further including means for transmitting information.

12. Apparatus according to claim 7, further including a light source for illuminating said object.

13. Apparatus according to claim 7, wherein said apparatus is a cellular phone.

14. A method for controlling a handheld computing device comprising the steps of:
   providing a computer within said device;
   associating a camera with said device, said camera viewing at least a portion of the body of a user operating said device or an object held by said user, in order provide image data concerning said portion or object;
   using said computer, analyzing said image data to determine information concerning a user input command; and
   from said determined information, controlling a function of said device.

15. A method according to claim 14, wherein reflected light from said body portion or object is imaged by said camera.

16. A method according to claim 14, wherein said information includes the position of the portion or object.

17. A method according to claim 14, wherein said information includes the change in position of the portion or object.

18. A method according to claim 14, wherein said information includes the velocity or path of the portion or object.

19. A method according to claim 14, wherein said information is obtained in 3 dimensions.

20. A method according to claim 14, wherein said information includes the pointing direction of the portion or object.

21. A method according to claim 14, wherein a display is controlled.

22. A method according to claim 21, wherein a virtual image on said display is moved or changed.

23. A method according to claim 21, wherein said display is a 3D display.

24. A method according to claim 23, wherein said display is a stereoscopic display.

25. A method according to claim 14, including the further step of transmitting data to a further device.

26. A method according to claim 14, wherein said camera operates at 30 frames per second or greater.

27. A method according to claim 14, wherein said controlled function relates to a game.

28. A method according to claim 14, including the further step of acquiring a picture of the user of the handheld device.

29. A method according to claim 14, wherein two fingers of the user are sensed and a pinching action determined.

30. A method according to claim 14, wherein said body portion indicates an expression of said user.

31. A method according to claim 14, wherein said information provides an aid to speech recognition.

* * * * *